US012608584B2

(12) United States Patent
Koh et al.

(10) Patent No.: US 12,608,584 B2
(45) Date of Patent: Apr. 21, 2026

(54) AGENT-BASED MODELER USING MULTIMODAL INPUT

(71) Applicant: AARU, INC., Winnetka, IL (US)

(72) Inventors: Edward Koh, Winnetka, IL (US);
Cameron Fink, Winnetka, IL (US);
John Kessler, Litchfield, NH (US)

(73) Assignee: AARU, INC., Winnetka, IL (US)

( * ) Notice: Subject to any disclaimer, the term of this
patent is extended or adjusted under 35
U.S.C. 154(b) by 0 days.

(21) Appl. No.: 19/234,079

(22) Filed: Jun. 10, 2025

(65) Prior Publication Data

US 2025/0378385 A1      Dec. 11, 2025

Related U.S. Application Data

(60) Provisional application No. 63/746,745, filed on Jan.
17, 2025, provisional application No. 63/658,305,
filed on Jun. 10, 2024.

(51) Int. Cl.
*G06N 20/00*          (2019.01)
*G06F 9/451*          (2018.01)
(52) U.S. Cl.
CPC ............. *G06N 20/00* (2019.01); *G06F 9/451*
(2018.02)
(58) Field of Classification Search
None
See application file for complete search history.

(56) References Cited

U.S. PATENT DOCUMENTS

| | | | |
|---|---|---|---|
| 6,741,974 | B1 | 5/2004 | Harrison et al. |
| 7,263,474 | B2 | 8/2007 | Fables et al. |
| 11,188,809 | B2 | 11/2021 | Herzig et al. |
| 11,551,165 | B1 | 1/2023 | Reynders |
| 12,217,174 | B2 | 2/2025 | Gurumurthy |
| 2004/0181376 | A1 | 9/2004 | Fables et al. |
| 2006/0020565 | A1 | 1/2006 | Rzevski et al. |
| 2015/0106308 | A1 | 4/2015 | Harrison et al. |
| 2018/0300598 | A1 | 10/2018 | Crabtree et al. |

(Continued)

OTHER PUBLICATIONS

Ben Said et al., Agent-based Interaction Analysis of Consumer
Behavior, AAMAS '02, Jul. 15-19, 2002, Bologna Italy, down-
loaded Aug. 14, 25, https://dl.acm.org/doi/pdf/10.1145/544741.
544787 2002.

(Continued)

*Primary Examiner* — David R Vincent
(74) *Attorney, Agent, or Firm* — PERKINS COIE LLP

(57)          ABSTRACT

Systems and methods for simulating multi-agent within a
virtual world in response to generated hypotheses are dis-
closed herein. The system can generate a virtual world that
includes a set of agents. The system can receive instructions
that include a question, including a first query and a first
input item, and a set of input traits, which can be used to
instantiate a set of agents. The system can generate a first
hypothesis representing the first input item and can execute
a first simulation session to generate a first output set. The
system can generate a second data schema associated with a
second hypothesis and execute a second simulation session
to generate, using the second hypothesis and the first query,
a second output set. Accordingly, the system can generate a
sentiment summary and display the sentiment (impression)
summary at a graphical user interface (GUI) accessible to an
experimenter.

20 Claims, 13 Drawing Sheets

(56)  References Cited

U.S. PATENT DOCUMENTS

| | | | |
|---|---|---|---|
| 2018/0336045 A1 | 11/2018 | Badr | |
| 2019/0373005 A1 | 12/2019 | Bassett | |
| 2020/0110416 A1 | 4/2020 | Hong et al. | |
| 2021/0104171 A1 | 4/2021 | White | |
| 2021/0304018 A1 | 9/2021 | Usman et al. | |
| 2022/0230194 A1* | 7/2022 | Reynolds | G06F 40/40 |
| 2022/0366235 A1 | 11/2022 | Cassirer | |
| 2023/0042431 A1 | 2/2023 | Ramamoorthy et al. | |
| 2023/0316131 A1 | 10/2023 | Vandikas et al. | |
| 2024/0043034 A1 | 2/2024 | Johnson et al. | |
| 2024/0184948 A1 | 6/2024 | Shu et al. | |
| 2024/0217548 A1 | 7/2024 | Pronovost | |
| 2024/0303501 A1 | 9/2024 | Zhang et al. | |
| 2024/0418515 A1* | 12/2024 | Wu | G06F 40/40 |
| 2025/0165678 A1* | 5/2025 | Low | G06F 30/27 |
| 2025/0378238 A1 | 12/2025 | Koh et al. | |
| 2025/0378239 A1 | 12/2025 | Koh et al. | |
| 2025/0378301 A1 | 12/2025 | Koh et al. | |
| 2025/0378382 A1 | 12/2025 | Koh et al. | |
| 2025/0378383 A1 | 12/2025 | Koh et al. | |
| 2025/0378384 A1 | 12/2025 | Koh et al. | |
| 2025/0378385 A1 | 12/2025 | Koh et al. | |

OTHER PUBLICATIONS

Togan et al., An improved genetic algorithm with initial population strategy and self-adaptive member grouping, 2007, Computers and Structures 86 (2008) pp. 1204-1218, https://www.sciencedirect.com/science/article/pii/S004579490700301X (2007).

* cited by examiner

200

900

920

| Key 922 | Value 924 |
|---|---|
| Length | 1,123 px |
| Width | 2,209 px |
| Background Color | Pink |
| Foreground Text | 'LOGO' |
| Foreground Color | Blue |
| Contrast | 83% |
| Border Style | Curved |

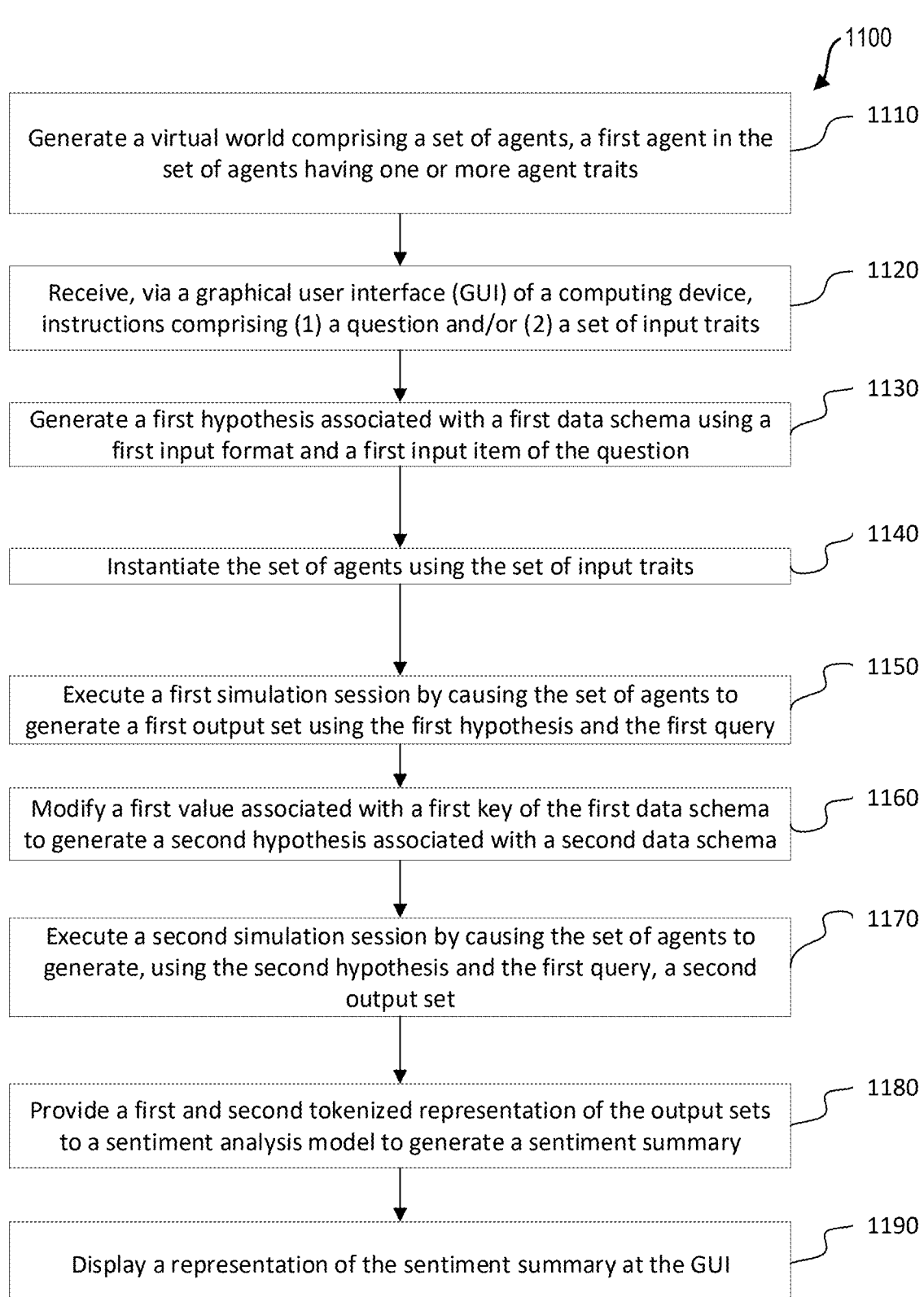

1100

Generate a virtual world comprising a set of agents, a first agent in the set of agents having one or more agent traits ⟶ 1110

Receive, via a graphical user interface (GUI) of a computing device, instructions comprising (1) a question and/or (2) a set of input traits ⟶ 1120

Generate a first hypothesis associated with a first data schema using a first input format and a first input item of the question ⟶ 1130

Instantiate the set of agents using the set of input traits ⟶ 1140

Execute a first simulation session by causing the set of agents to generate a first output set using the first hypothesis and the first query ⟶ 1150

Modify a first value associated with a first key of the first data schema to generate a second hypothesis associated with a second data schema ⟶ 1160

Execute a second simulation session by causing the set of agents to generate, using the second hypothesis and the first query, a second output set ⟶ 1170

Provide a first and second tokenized representation of the output sets to a sentiment analysis model to generate a sentiment summary ⟶ 1180

Display a representation of the sentiment summary at the GUI ⟶ 1190

FIG. 11

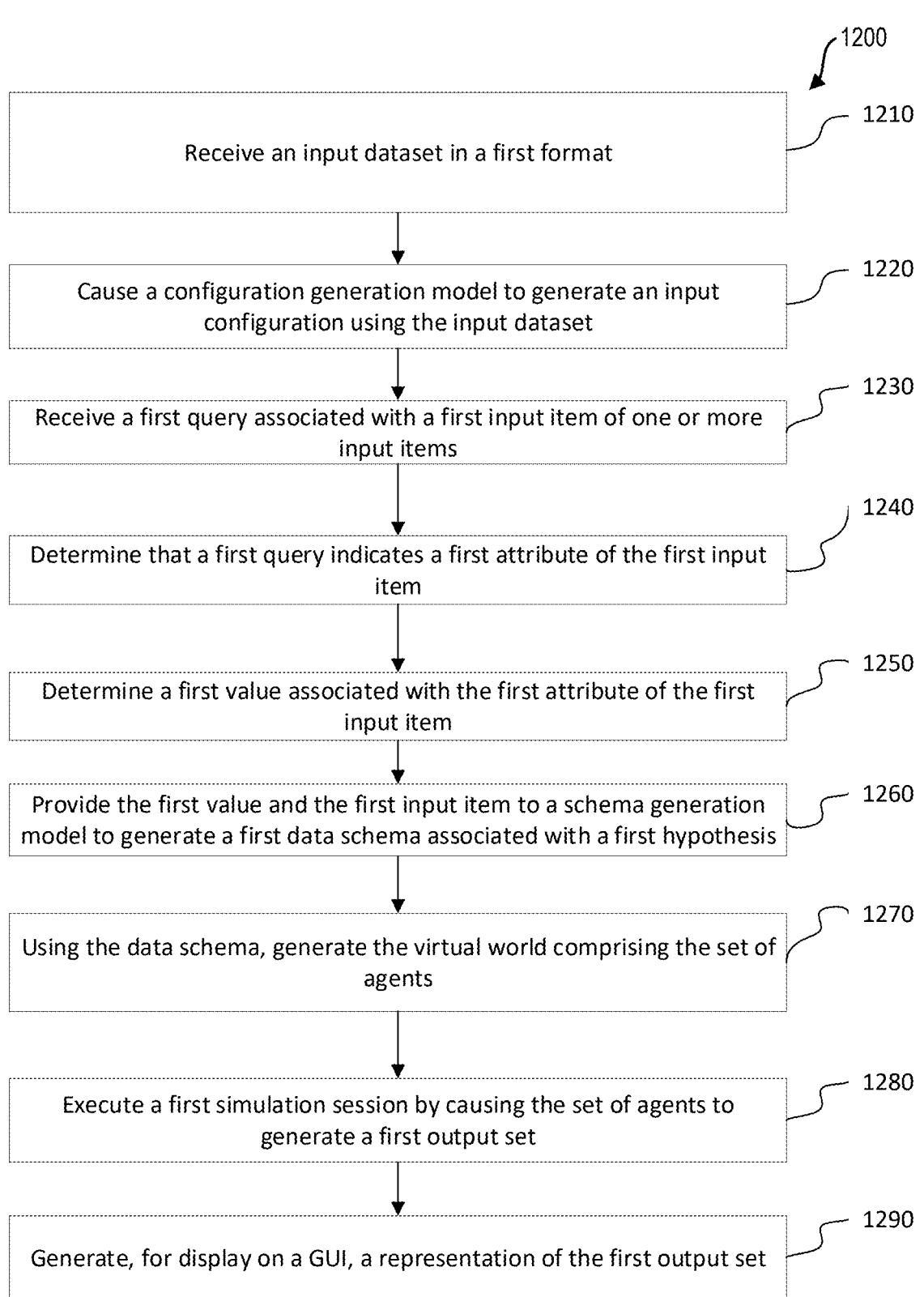

1200

Receive an input dataset in a first format — 1210

Cause a configuration generation model to generate an input configuration using the input dataset — 1220

Receive a first query associated with a first input item of one or more input items — 1230

Determine that a first query indicates a first attribute of the first input item — 1240

Determine a first value associated with the first attribute of the first input item — 1250

Provide the first value and the first input item to a schema generation model to generate a first data schema associated with a first hypothesis — 1260

Using the data schema, generate the virtual world comprising the set of agents — 1270

Execute a first simulation session by causing the set of agents to generate a first output set — 1280

Generate, for display on a GUI, a representation of the first output set — 1290

FIG. 12

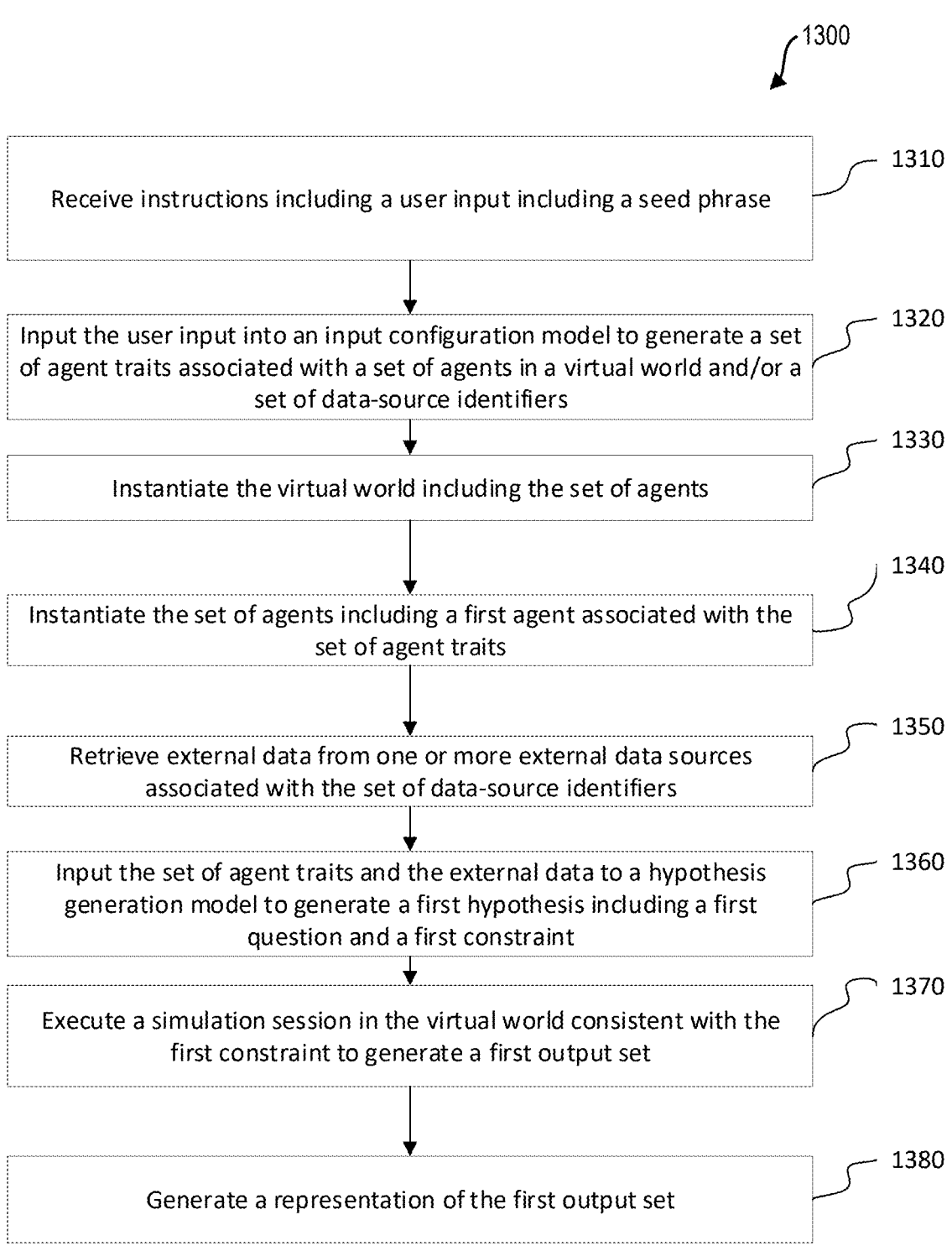

1300

1310
Receive instructions including a user input including a seed phrase

1320
Input the user input into an input configuration model to generate a set of agent traits associated with a set of agents in a virtual world and/or a set of data-source identifiers 1330
Instantiate the virtual world including the set of agents 1340
Instantiate the set of agents including a first agent associated with the set of agent traits 1350
Retrieve external data from one or more external data sources associated with the set of data-source identifiers 1360
Input the set of agent traits and the external data to a hypothesis generation model to generate a first hypothesis including a first question and a first constraint 1370
Execute a simulation session in the virtual world consistent with the first constraint to generate a first output set 1380
Generate a representation of the first output set

FIG. 13

AGENT-BASED MODELER USING MULTIMODAL INPUT

CROSS-REFERENCE TO RELATED APPLICATION(S)

This application claims the benefit of U.S. Provisional Application Nos. 63/658,305 filed Jun. 10, 2024, and 63/746,745 filed Jan. 17, 2025, which are incorporated in their entireties and for all purposes. This application is related to U.S. patent application Ser. No. 19/233,125 filed Jun. 10, 2025 and titled MULTI-AGENT SIMULATOR PLATFORM (Ref. No.: 155414.8003.US00). This application is related to U.S. patent application Ser. No. 19/233,772 filed Jun. 10, 2025 and titled AGENT TRAIT DIFFUSION SIMULATION TECHNIQUES FOR MULTI-AGENT SIMULATOR PLATFORM (Ref. No.: 155414.8004.US00). This application is related to U.S. patent application Ser. No. 19/234,101 filed Jun. 10, 2025 and titled AGENT-BASED MODELER USING DYNAMIC MODEL-PARAMETER AND CONSTRAINT GENERATION (Ref. No.: 155414.8005.US00). This application is related to U.S. patent application Ser. No. 19/233,897, filed Jun. 10, 2025 and titled AGENT INSTANTIATION AND CALIBRATION FOR MULTI-AGENT SIMULATOR PLATFORM (Ref. No.: 155414.8006.US00). This application is related to U.S. patent application Ser. No. 19/233,962, filed Jun. 10, 2025 and titled AGENT QUERY TECHNIQUES FOR MULTI-AGENT SIMULATOR PLATFORM (Ref. No.: 155414.8007.US00). This application is related to U.S. patent application Ser. No. 19/234,043, filed Jun. 10, 2025 and titled AGENT-BASED MODELER USING MULTI-MODAL INPUT PROCESSING AND ATTRIBUTE EXTRACTION (Ref. No.: 155414.8008.US00). The content of the foregoing applications is incorporated herein in its entirety by reference.

TECHNICAL FIELD

The systems, methods, and computer-readable media disclosed herein relate generally to generative social science and include computer-based multi-agent simulation techniques.

BACKGROUND

Conventional sentiment analysis techniques, such as rule-based models, can be used to identify, extract, and classify qualitative information. For example, rule-based models can analyze news articles using keyword extraction to determine sentiment toward a particular politician. However, such approaches fail to account for time-dependent or complex causal links between various entities that can affect sentiment. For example, conventional sentiment analysis models cannot capture how changing conditions (e.g., communications, interactions, and/or actions attributable to various entities that can affect the environment in which sentiment analysis data is collected) can amplify, vary, or modify sentiment.

Moreover, conventional approaches for sentiment modeling rely on inputs that have pre-determined formats, which makes such techniques unsuitable for use with varied data types and multimodal data inputs.

BRIEF DESCRIPTION OF THE DRAWINGS

FIG. 11 is an example flowchart showing operations of the multi-agent simulator platform, according to some arrangements.

FIG. 12 is an example flowchart showing operations of the multi-agent simulator platform using multimodal input processing and attribute extraction, according to some arrangements.

FIG. 13 is an example flowchart showing of the multi-agent simulator platform using dynamic model-parameter and constraint generation, according to some arrangements.

Figure 1:
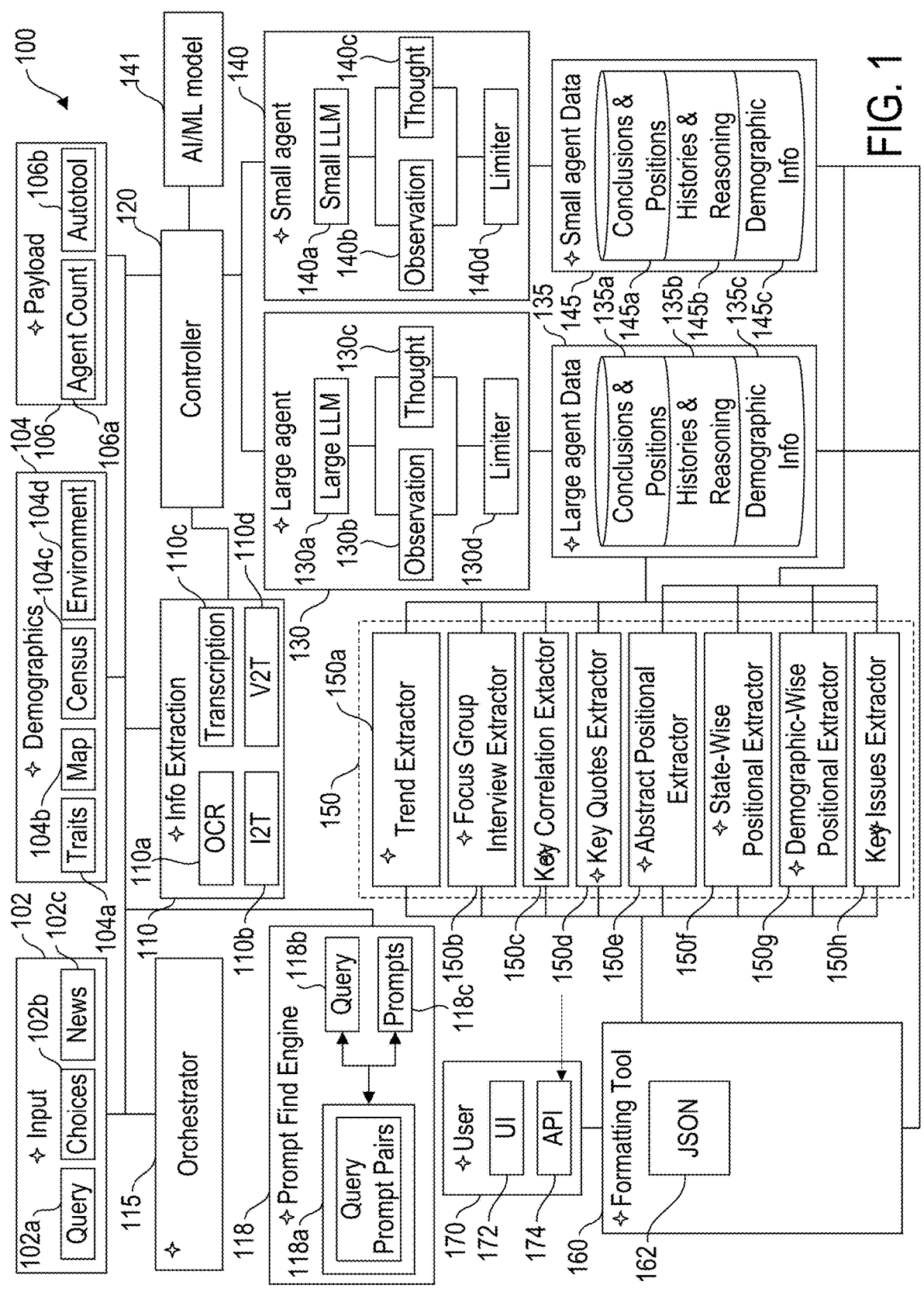
FIG. 1 shows an example computing environment that illustrates aspects of an orchestration engine for a multi-agent simulator platform, in accordance with some implementations of the present technology.

The drawings have not necessarily been drawn to scale. For example, some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents and alternatives falling within the scope of the technology as defined by the appended claims.

DETAILED DESCRIPTION

Overview of the Agent Sentiment Modeling Platform

Disclosed herein are computer-implemented multi-agent simulator platforms (e.g., a sentiment modeling platform) and methods that enable simulation of complex virtual worlds and analysis of behavior or sentiment of agents within those worlds, such as in response to questions (e.g., hypotheses) about the simulated world. The virtual worlds can be representative of physical, virtual, or digital worlds, such as computing environments, network configurations, communities, business environments, companies, or markets, which are normally difficult to capture in computer-based simulations due to complex agent interactions and challenging environmental conditions. For example, the sentiment modeling platform disclosed herein can be implemented using one or more components described with respect to drawings, such as FIG. 1, 2, 3, 4, 5, or 6 or various combinations thereof, as described below.

According to various use cases, the platform can generate computer-based simulations of agent behavior in various fields including cybersecurity, system architectures, urban planning, economics, sociology, and epidemiology. For instance, the platform can be used to model complex interactions between various components of a distributed network (e.g., in response to one or more cybersecurity vulnerabilities or attacks). As another example, the platform models the impact of a new transportation system on motorist behavior and traffic patterns. In another example, the platform can be used to study the effects of policy changes on market behavior. The platform can also be used to model the behavior of larger populations, allowing for the study of the spread of diseases, the impact of social movements, and the like. By providing a virtual sandbox for testing and experimentation, the platform provides a robust tool for understanding and predicting the behavior of complex systems.

In various implementations, the platform receives or generates virtual world questions (queries) and hypotheses and uses these items to generate simulation contexts and instantiate sets of agents that have particular attributes or features and behaviors. One or more hypotheses can be associated with a scenario (e.g., a cybersecurity intrusion or vulnerability). For example, a hypothesis can be associated with a question requesting a complex system's reaction to a particular security vulnerability (e.g., a stimulus). To illustrate, a particular hypothesis (e.g., a stimulus) can be associated with an attack vector, exploit code, a misconfiguration error, a new patch, and/or a system-wide policy change. As such, the platform enables simulation of reactions (e.g., by distinct components of a multi-component system), interactions (e.g., between different subsystems or components), and/or operations (e.g., as captured in log files and/or other alphanumeric data) in response to hypotheses tested using instantiated agents (e.g., representative models of individual system components or other suitable entities within a multi-component computing system or network).

Conventional approaches to simulating system-wide or world conditions, such as conventional cybersecurity risk evaluation systems, often face significant challenges when dealing with complex, multi-faceted stimuli, such as well-developed and/or comprehensive security intrusions. For example, conventional simulations if cybersecurity intrusions generally rely on textual or alphanumeric inputs of system configurations or constrained markup-language inputs, leading to computationally intensive and incompatible consumption of cybersecurity-related data from different formats or from different systems. Often, hypotheses, which can be thought of as scenarios to be tested within the simulation, such as scenarios involving one or more cyber-security threats, are pre-determined and separated into distinct input items or artefacts, thereby compounding the computational burden of running various scenarios with different stimuli. For instance, testing multiple iterations of a hypothesis or security exploit (e.g., by tweaking exploit obfuscation levels or command-and-control communication channels) traditionally requires manual creation or development of attack parameters and/or the use of computationally expensive generative AI techniques, an expense that escalates sharply when the inputs include mixed-media phishing lures, full disk images, live malware samples, or other mixed-media content.

Moreover, the stimuli (e.g., exploits or other suitable inputs into the simulation) can be multimodal and involve diverse data types and formats, ranging from textual elements to image elements (e.g., audiovisual images and/or disk images) or dynamic media such as videos (e.g., containing a trojan horse vulnerability). To illustrate, a single vulnerability can include a combination of image elements, video elements, and/or disk-image instructions that are capable of interacting with one another. Conventional models can struggle to process and analyze these varied inputs (e.g., varied vulnerabilities to be simulated) cohesively, often requiring separate handling logic for each component. Such a fragmented approach not only increases complexity but also, by separately processing the inputs, limits the model's ability to capture the nuanced interplay between elements of a given stimulus (e.g., multi-faceted vulnerability).

The disclosed technology addresses these challenges by introducing a novel approach to agent-based (e.g., system component-based) modeling based on complex interactions between various agents in a multi-agent simulation on the basis of human- or system-generated hypotheses, where the hypotheses can be used to test multimodal data inputs. The disclosed technology enables modular, low-computational cost generation and modification of hypotheses (e.g., for creation of mutations of a particular system vulnerability) by creating data schemas that specify different properties and attributes of the input data (e.g., data associated with stimuli, vulnerabilities, intrusions, and/or scenarios). The data schema can include attributes and associated values associated with a particular input item, such as a delivery vector, obfuscation level, command-and-control protocol, required privilege, persistence mechanism, file format, color, size, font-size, or contrast (e.g., in the case of image-based data). This representation enables the system to modify or manipulate individual attributes modularly for generation of and fine-tuning of particular hypotheses or scenarios associated with the multi-agent simulator platform (e.g., a sentiment modeling platform and/or a cyber-vulnerability simulator platform) without regenerating associated input files. By doing so, the disclosed technology reduces computational resource usage by reducing the number of read/write operations required to store, manipulate, and process input data (e.g., data associated with a vulnerability or system attack) with varying characteristics or attributes.

To illustrate, the disclosed technology enables storage of an input item associated with a particular input format (e.g., of a disk-image type). Using the stored input item, the multi-agent simulator platform can generate a data schema that represents key attributes of the input item (e.g., key attributes of a particular attack), as well as other data schemas that represent modifications of the stored input item based on varying characteristics described with the data schemas. For example, the data schema links to and/or enables retrieval of data from a cache of the stored input item, thereby enabling hypothesis testing of variations of a particular complex attack (e.g., a combination of a phishing attack, spoofing attack and/or another suitable vulnerability) without generating, processing, or re-characterizing bulky data (e.g., entire disk images). By doing so, the disclosed technology improves the computational efficiency of the generation of multiple queries or hypotheses for testing within the virtual computing environment or world (e.g., via multi-agent or multi-component simulations) to test various, complex cybersecurity-related hypotheses that are parametrically related to one another. As such, the disclosed technology can create and test multiple, parametrically related attack scenarios by manipulating only relevant attributes within the data schema, enabling rapid, fine-grained hypothesis testing (e.g., toggling between different payloads, privilege levels, or lateral movement techniques) without the need to re-image or redeploy entire virtual machines.

The techniques disclosed herein enable the generation of hypotheses based on a single, multimodal input by systematically varying particular aspects or attributes defined within the data schema that can accommodate multimodal inputs. For example, the multi-agent simulator platform (e.g., the agent sentiment modeling platform and/or cyber-vulnerability simulation platform described herein) enables hypothesis testing for different attack vectors, system communication channels, obfuscation levels, and/or other parameters without requiring generation of different input files or extensive computational resources for generating full versions of these inputs (e.g., without generating a new disk image for each variation of an attack). This capability enables comprehensive testing of various stimuli or hypotheses, such as in a time-dependent or time-independent manner, with respect to the agents within the simulated system environment or world. For example, in some implementations, the platform generates a set of hypotheses (e.g., natural language questions and associated data schemas/inputs) and executes an independent multi-agent simulation for each hypothesis. Additionally or alternatively, the platform generates a set of hypotheses and provides each hypothesis to sets of agents (e.g., representing various system-related components, such as virtual machines, hardware devices, or other suitable entities) one by one (e.g., in the form of a question chain), enabling agents to react to and process hypotheses and questions in a time-dependent manner 9 e.g., in order), enabling analysis of complex reactions and causal links between different hypotheses (e.g., different cybersecurity attack scenarios) and associated agents (e.g., representing system components). Such an approach can enable agents to compare and/or analyze relationships between hypotheses, providing complex sentiment-related information.

Moreover, the multi-agent simulator platform disclosed herein enables generation of hypotheses with complex, modular input information. For example, the platform receives input information with multiple components, such as a cybersecurity attack that includes a phishing attack, a trojan horse attack, and/or a malicious attachment. By treating these attack components using a single data schema (e.g., with different attributes or properties associated with each component) requiring individual processing, the disclosed technology allows the components to be represented within a single input structure for processing by system-component agents (and/or other agents representing other suitable entities) within the simulation. The data schema can include attributes associated with email subject, attachment file type, exploit technique, privilege level, network segment, and/or persistence mechanism, enabling the system to modularly modify individual attributes (e.g., for generation of subsequent attack hypotheses) while maintaining the overall context of the cyberattack scenario. By doing so, the platform can account for complex interactions between various components of a cyberattack scenario (or, more broadly, hypotheses) in generating an associated risk analysis (e.g., sentiment analysis), thereby providing a holistic, efficient, and effective way to simulate complex hypotheses (e.g., when analyzing multi-stage cyberattacks and associated system responses).

In some implementations, the multi-agent simulator platform (e.g., a cyber-vulnerability simulation platform and/or a sentiment modeling platform) generates a virtual computing environment that includes a set of agents, including a first agent that is associated with particular traits (e.g., system configuration information). The agent can have traits including operating system version, installed security software, and user privilege level, thereby enabling the virtual environment to simulate a variety of entities (e.g., different types of endpoints or network devices within an enterprise infrastructure).

The multi-agent simulator platform disclosed herein can receive instructions that include a question (e.g., relating to a cyber-vulnerability attack scenario) and a set of input traits. For example, a user of the platform provides a query, such as the question, "How will a new cybersecurity exploit campaign affect the network?" Along with the query, the user can provide one or more associated input items, such as a malware binary associated with the exploit campaign and/or associated phishing email template or lateral-movement script. The user can provide further information relating to particular system configurations or traits associated with specific endpoints or network segments for generation of relevant agents within the virtual environment (e.g., the virtual world).

The multi-agent simulator platform can use the first input item to generate a hypothesis for testing within the virtual environment. For example, the multi-agent simulator platform generates a data schema that captures information relating to the input item(s) in a key-value-pair format. The keys of the schema can correspond to different attributes (e.g., of an attack campaign, such as indications of an exploit technique, payload type, command-and-control port, or required privilege level), and the values can include entries for particular keys of the schema. By generating a hypothesis via a data schema, the platform enables modular, flexible manipulation, handling, and processing of a variety of input items (e.g., of distinct formats), thereby improving the flexibility of the platform for simulating different scenarios (e.g., hypotheses or stimuli).

The multi-agent simulator platform can instantiate the set of agents using the set of input traits and execute a first simulation session with the set of agents. For example, the platform causes the set of agents to generate a first output set based on the first hypothesis and first query. The output set can include textual or non-textual (e.g., multimodal, telemetry, or binary-log) information in response to a query within the user's instructions. To illustrate, in response to a question relating to how a new exploit campaign many affect a particular subsystem, a particular agent (e.g., a particular system component) with particular traits (e.g., a particular system configuration) can produce an output (e.g., a text/string/alphanumeric syslog entry, IDS alert, or packet-capture snippet) that responds to the question relating to how the attack progresses, using behavior characteristics of the agents of the particular traits. The output set can include one or more of these reactions (e.g., sentiment tokens or impressions) to the query (e.g., of one or more formats) to enable sentiment/impression/risk analysis based on the received input items.

In some implementations, the multi-agent simulator platform (e.g., a cyber-vulnerability simulator platform or a sentiment modeling platform) modifies a value associated with a key (e.g., changes a "protocol" value of a "command-and-control channel" key associated with an exploit) of the first data schema to generate the second data schema. By doing so, the platform enables generation of subsequent hypotheses based on modifications or iterations of attributes associated with the first input item without generating additional input items from scratch, thereby improving the computational efficiency, modularity, and flexibility of simulations and subsequent risk modeling.

The platform can execute a second simulation session by causing the set of agents to generate, using the second hypothesis, a second output set. To illustrate, the platform causes the set of agents to generate another output set (e.g., including textual and/or non-textual information) based on the modified, second data schema, thereby enabling testing of another hypothesis or scenario, such as a scenario in which the exploit incorporates a command-and-control channel of a different port than that of the first input item. By doing so, the platform facilitates rapid and efficient testing of multiple variations of an attack campaign (e.g., without the need for creating separate input files representing different exploits, or expending significant computational resources for each iteration).

Based on the first output set and the second output set, the multi-agent simulator platform can perform a risk analysis (e.g., a sentiment or impression analysis of the agents) associated with the generated hypotheses and display an associated analysis on a graphical user interface (GUI). For example, the platform generates a first impression token (e.g., a risk token or a sentiment token) associated with the first output set (e.g., associated with the first hypothesis) and a second impression token (e.g., a risk token or a sentiment token) associated with the second output set (e.g., the second hypothesis) to perform a risk analysis (e.g., a sentiment analysis) by extracting relevant information and/or changes thereof associated with the varied hypotheses (e.g., from the agents). To illustrate, the platform provides the first and second output sets (e.g., including agents' reactions to the generated hypotheses) to an artificial intelligence model or associated large-language model to generate tokens (e.g., words, phrases, sentences, or other natural-language units) that describe the risk and/or changes in risk associated with the first and second output sets. By doing so, the platform enables analysis of reactions to complex and varied inputs, such as multi-stage cyberattack campaigns, including binaries (e.g., malware executables), packet captures (e.g., network-traffic dumps), firmware images (e.g., embedded-device firmware), or other information based on hypotheses associated with different data schema that represent these campaigns.

Additionally or alternatively, the multi-agent simulator platform can receive input information with multiple components, such as a marketing strategy that includes a logo, slogan, and/or a packaging design. By treating these components using a single data schema (e.g., with different attributes or properties associated with each component) requiring individual processing, the disclosed technology allows the components to be represented within a single input structure for processing by agents within the simulation. The data schema can include attributes associated with logo color, logo size, logo font, slogan text, packaging material, packaging color, and/or packaging shape, thereby enabling the system to modularly modify individual attributes (e.g., for generation of subsequent hypotheses) while maintaining the overall context of the marketing strategy. By doing so, the platform can account for complex interactions between various components of the marketing strategy (or, more broadly, hypotheses) in generating an associated sentiment analysis (e.g., analogous to a risk analysis of a cyber-vulnerability simulator platform), thereby providing a holistic, efficient, and effective way to simulate complex hypotheses (e.g., when analyzing complex marketing strategies and associated consumer behaviors).

In some implementations, the multi-agent simulator platform (e.g., an agent sentiment modeling platform) generates a virtual world that includes a set of agents, including a first agent that is associated with particular traits (e.g., demographic information). The agent can have traits including age, income, and/or education level. The multi-agent simulator platform can receive instructions that include a question and a set of input traits. For example, a user of the platform provides a query (e.g., a question, "How will our new marketing campaign be received?"). Along with the query, the user can provide one or more associated input items, such as an image of a logo associated with the new marketing campaign and/or an associated slogan or product design.

The multi-agent simulator platform can use the first input item to generate a hypothesis for testing within the virtual world. For example, the platform generates a data schema capturing information relating to the input items in a key-value pair format, where the keys can correspond to different attributes of a marketing campaign (e.g., indications of a logo size, color, background color, or an associated slogan/font). The values can include entries for the particular keys of the schema.

The platform can instantiate a set of agents using the set of input traits and execute a first simulation session with the set of agents. To illustrate, in response to a question relating to how a new marketing campaign may be received by a particular demographic, a particular agent with particular traits can produce an answer (e.g., a text/string/alphanumeric natural language output) that corresponds to the question relating to how a marketing strategy is received, using language that is characteristic of agents with the particular traits. The output set can include one or more of these responses to the query (of one or more formats) to enable sentiment analysis based on the received input items.

The platform can execute a second simulation session by causing the set of agents to generate another output set (e.g., including textual and/or non-textual information) based on a modified, second data schema, thereby enabling testing of another hypothesis or scenario, such as a scenario in which the logo incorporates a background of a different color to that of the first input item. Based on the first output set and the second output set, the platform can perform a sentiment analysis (e.g., an impression analysis or a risk analysis) associated with the generated hypotheses and display an associated analysis on a graphical user interface. For example, the platform generates a first sentiment token associated with the first output set (e.g., associated with the first hypothesis) and a second sentiment token associated with the second output set (e.g., associated with the second hypothesis) to perform a sentiment analysis by extracting relevant sentiment and/or changes thereof associated with the varied hypothesis.

To illustrate, the platform provides the first and second output sets (e.g., including agents' reactions to the generated hypotheses) to an artificial intelligence model to generate tokens (e.g., words, phrases, sentences, or associated natural language units) that describe the sentiment and/or changes in sentiment associated with the first and/or second output sets. By doing so, the platform enables analysis of reactions to complex and varied inputs, such as multi-component marketing strategies, including images (e.g., of logos), audio (e.g., of jingles or slogans), video (e.g., of advertisements), or other information based on hypotheses associated with different data schema that represent these strategies.

As used herein, the terms "agent", "local agent", "agent node" and similar terms refer to entities that interact with their environment, process information, and/or take actions to achieve specific goals or objectives, such as the goals or objectives determined based on experimenter questions/queries, and/or inferred from the environment (e.g., by considering the rules, events, attributes, and/or constraints in a virtual world). An agent can be thought of as a combination of software, firmware and/or hardware components that encompass characteristics (e.g., traits, attributes, properties, and/or knowledge), states (e.g., user question or its derivatives, agent feedback), and/or agent interaction rules that govern its behavior and communication with other agents. The agent interaction rules can include references to models (e.g., AI/ML model, such as neural networks) that define agents' decision-making processes and behaviors. Instantiating (spawning) an agent refers to the process of creating a new instance of an agent entity, class or object, which can involve allocating memory for the agent's data structures and variables, initializing agent attributes, setting up agent communication channels, and activating agent reasoning and decision-making mechanisms. This process can be compared to creating a new thread or process in a computer program, where the instantiated agent operates as a separate entity, executing autonomously and interacting with its environment and other agents. Depending on the implementation, agents can take various forms, such as executables running on physical and/or virtual machines and/or robotic agents interacting with physical environments. In some cases, agents can be instantiated as containerized applications, leveraging technologies like Docker, or as serverless functions, utilizing platforms like AWS Lambda. Additionally, agents can be implemented using various programming paradigms, including object-oriented, functional, or logic-based programming, and can be designed to operate in diverse domains, such as e-commerce, healthcare, finance, or transportation.

Agents can use physical or virtualized resources (e.g., elements of FIGS. 2, 3 and/or 4, such as processors, memory, cache, communication interfaces, devices, databases, servers, components of the AI/ML stack) in any suitable combination. Particular ones of such resources can be statically allocated or dynamically allocated at runtime (e.g., to a particular agent or group of agents for a duration of a simulation session or a set of simulation sessions). Particular ones of such resources can be dedicated, shared among agents, or shared between an agent and other processes. Various components of agents (e.g., models, data stores, executables) can be implemented across resources in a distributed manner. Accordingly, unless otherwise indicated by context or expressly noted, the terms "local" (as in "local agent") and "node" (as in "agent node") should not be automatically assumed to refer to a particular unitary physical resource.

The terms "engine", "logic", and like terms should be understood as referring to hardware, firmware, software, and/or combinations thereof, including particularly configured devices structured to perform operations such as the operations described herein in any suitable combination.

The terms "risk," "sentiment", "impression", and like terms should be understood as denoting the computationally inferred risk-related, emotional, attitudinal, or subjective valence associated with a particular entity, concept, or experience, as represented in digital data and interpreted or generated by artificial intelligence systems or other computer-based agents, which can generate sentiment output that approximates human-like response. Sentiment output can include values, scores, tokens (e.g., natural-language qualifiers, such as adverbs and adjectives), or classifications (e.g., positive, negative, neutral) that characterize the emotional tone or attitude conveyed in various forms of data, including text, audio data, speech patterns, video data, facial expression analysis, neural data (e.g., brain activity patterns), and other multimodal inputs, such as acoustic features, linguistic patterns, and behavioral signals.

Various elements of the invention are sometimes described according to groups, implementations, or use cases for brevity. One of skill will appreciate that variations of such combinations are contemplated.

Orchestrator Engine for a Multi-Agent Simulator Platform

FIG. 1 shows an example computing platform 100 that includes an orchestrator engine for multi-agent simulator platform (e.g., and/or the associated sentiment modeling platform) in accordance with some implementations of the present technology. To illustrate, one or more components of the computing platform 100 can implement one or more processes associated with the sentiment modeling platform disclosed herein. As an overview, the computing platform 100 facilitates orchestration of AI/ML models, including models associated with agents, natural language processing, and/or other suitable models (e.g., sentiment analysis models or data conversion models). The AI/ML models can include neural networks, such as large language models (LLMs), to respond to user queries, prompts and so forth. For instance, various circuits (modules) of the systems described here can include circuits (e.g., application specific integrated circuits (ASIC), engines, logic, executables and the like) that can include a set of neurons and a set of synaptic circuits that link the neurons in a neural network. The neurons can include, for example, memory units (e.g., registers), processors units (e.g., microprocessors) and/or input gates. The synaptic circuits can include memory units that store synaptic weights. Additionally or alternatively, the AI/ML models can include Generative Adversarial Networks (GANs), Sparce Linear Models (SLMs), and/or Support Vector Machines (SVMs). Instances of neural networks (or other suitable AI/ML models) are trained neural networks that represent agents, which can be instantiated as needed to handle a specific task and/or answer a specific question or set of questions.

A controller and an orchestrator can selectively instantiate and/or turn specific agents on or off based on various factors, such as query complexity, modality of the information analyzed or retrieved, modality of the output, agent count parameters, or other factors. For instance, they can instantiate agents with specialized skills or knowledge to handle complex queries, such as multi-step problems or nuanced decision-making scenarios, based on query complexity. They can also activate agents that can process specific types of data, such as text, images, or audio, to analyze or retrieve information from diverse sources, depending on the modality of the information analyzed or retrieved. Additionally, they can selectively instantiate agents that can generate output in various formats, such as natural language, visualizations, or recommendations, to cater to different user preferences or requirements, based on the modality of the output. Furthermore, they can dynamically adjust the number of agents instantiated based on factors like system load, query volume, or available computational resources, using agent count parameters. Other factors can also be considered, such as contextual information, like user location, time of day, or current events; user preferences, such as language, tone, or level of detail; system performance, to optimize system performance, minimize latency, or reduce computational overhead; and knowledge graph updates, instantiating agents in response to updates in the knowledge graph, ensuring that the system remains up-to-date and accurate.

For example, consider a complex query that asks for a numerical recommendation and a qualitative statement for context: "Given the current global economic uncertainty, rising inflation and changing demographic trends in the United States, how persuasive is this particular marketing strategy, including this logo design, and how much would our sales increase if we were to adopt this marketing strategy?" To answer this query, the agent would consider current events and demographic trends, such as the latest inflation rates, economic forecasts, migration patterns, birth rates, death rates, and fashion/stylistic trends. The agent would employ various techniques, including Retrieval-Augmented Generation (RAG) to access relevant news articles and research papers, sales figures, knowledge graphs to identify relationships between economic indicators, demographics, and sales figures, and natural language processing (NLP) to analyze market sentiment and trends. By selectively instantiating agents with specialized skills and knowledge, the system can provide a comprehensive and up-to-date response, including a numerical analysis (e.g., "Sales figures might increase by 30% upon adoption of this marketing strategy.") and a qualitative statement for context (e.g., "Customers find this new logo much 'fresher' and more 'progressive,' which could lead to increased sales in your target demographic of young, urban consumers.").

In some implementations, agents can be classified as large agents or small agents. In some implementations, large agents can be trained neural networks that can produce output based on qualitative inputs. Small agents can be trained neural networks with architectures sufficient to enable the small agents to process quantitative data. Additionally or alternatively, agents can include additional AI/ML models, such as AI/ML model 141. The controller 120 can selectively determine the quantity of agents to instantiate and can further determine a ratio of small to large agents. For example, N small agents can be instantiated to generate numerical outputs. Sampling techniques can be applied to the population of N small agents to generate N' large agents where the ratio of N':N is in a predetermined range (e.g., between 1:1 and 1:100). In some implementations, N' is less than N. The N' large agents can receive and/or generate qualitative data to provide feedback additional to quantitative data. Utilizing small agents when appropriate enables the technical advantage of conserving computer resources and increasing the speed of execution of neural networks that underlie the agents.

The agents enable complex, reproducible and tunable simulations. The agents can simulate behavior, such as behavior of interviewees in a poll, consumer behavior, environmental conditions, collective behavior of autonomous machines, traffic, and so forth. The agents can be utilized to generate outputs, simulate focus group interviews, generate opinion and/or quote simulations, generate simulations of poll responses, generate simulations of purchasing scenarios, generate simulations of natural phenomena, generate simulations of machine failure and/or interaction, generate simulation of cell interaction in an organism, and so forth. To enable the agents to simulate behavior of entities or individuals with various traits, the agents can be trained using trait data, map (geographical data), census data, and/or additional suitable contextual data, including, without limitation, environmental data, biomedical signal data, medical intervention (treatment) data, human behavior data, machine configurations and feature sets, and so forth. In some implementations, the agents can be used to generate successive ensemble (chain-of-thought) simulations to enable modeling of complex scenarios.

In some implementations, the neural networks of the agents can be implemented as AI/ML systems, not shown here for brevity. In an example implementation, an AI/ML system can include a set of layers, which conceptually organize elements within a topology for the AI/ML system's architecture to implement a particular AI/ML model. In an example AI/ML model, information can pass through each layer of the AI/ML system to generate outputs for the AI/ML model. For example, an AI/ML system that implements a neural network can include a set of nodes that can have activation functions. As the neural network is trained, each node's activation function defines (or adjusts) how to node converts data received to data output. Together, the nodes and their activation function implement an AI/ML algorithm, which can be tuned using model parameters. The model parameters can represent the relationships learned by the neural network during training and can weight and bias the nodes and connections of the model. An example AI/ML stack is discussed in connection with FIG. 4.

In an example implementation of a multi-agent platform (e.g., the sentiment modeling platform), inputs 102 can be used by the orchestrator 115 to select appropriate combinations of large and/or small agents (130 and 140, respectively) to perform a particular task. In some implementations, the selection process can include the use of symbolic logic or rules-based logic, such as if-then statements. In some implementations, the selection process can include applying an AI/ML model 141 (e.g., a trained neural network or another AI/ML model) to the inputs 102 and/or modified inputs 110. To that end, inputs can include queries 102a, choices 102b, news sources 102c or other inputs. The inputs can be processed to generate modified inputs 110. For example, an optical character recognition (OCR) engine 110a can extract textual information from inputs that include images or video frames. In another example, an image-to-text engine 110b can transcribe image context to text. In another example, a transcription engine 110c can extract audio streams from video files and transcribe audio streams to text. In another example, a video-to-text engine 110d can transcribe video content to text (for example, by applying a trained neural network to generate descriptions of frame content in videos). In additional examples, the platform can change input data modalities, image attributes, audio attributes, video attributes, and so forth.

In some implementations, to facilitate gathering of inputs 102 and/or to facilitate generation of modified inputs 110, the platform can employ a prompt find engine 118. The prompt find engine 118 can utilize query stubs 118b and/or prompt stubs 118c to generate query-prompt pairs 118a. The query-prompt pairs 118a can then be executed to acquire inputs using queries 102a. In some implementations, the query-prompt pairs 118a can be utilized to generate parameters that define output domains for queries 102a (for example, by specifying format of content parameters or categorical values for outputs).

The controller 120 can determine, based on the inputs 102 and/or modified inputs 110, which agents should be instantiated. The controller 120 can make this determination using model payload configuration settings managed by the payload engine 106. For example, the payload engine 106 can store configuration information regarding agent count settings 106*a* and/or thresholds for simulations. In another example, the payload engine 106 can include an autotool 106*b*, which can be configured to generate an automatic estimate of the correct number of agents to use. The estimate can be based on various suitable factors, which can include keywords, tone, sentiment, and/or domain restrictions determined using the inputs 102 or modified inputs 110.

For example, these factors can be utilized by the controller 120 to determine, in conjunction with the payload engine 106, which agents and/or underlying models have been trained on subsets of demographic training data 104 needed to answer a particular question or perform a task. The demographic training data 104 can include, for example, trait data 104*a* (distribution of traits or characteristics within a domain), map data 104*b* (geographical maps having regions corresponding to distributions of traits), and/or census data 104*c* (trait data mapped to environmental data 104). Environmental data 104 can include any suitable contextual data, such as consumer purchasing history, consumer preferences, issue summaries, geopolitical indicators, economic indicators, weather indicators, traffic patterns, or other data. In some implementations, constraints of a particular virtual world (e.g., policy stores, rule stores, user-supplied trait preferences) can be referenced to generate further restrictions on agent quantities, types, traits, models to use, and so forth.

The large agents 130 and small agents 140 each include suitable trained neural networks (130*a*, 140*a*), such as LLMs. Large agents 130 can include neural networks with a comparatively higher number of nodes and/or layers (e.g., Mixtral 176B, Claude 3 Sonnet, GPT-4-Turbo, Gemini 1.5 Pro or another suitable neural network that has characteristics suitable for implementation as a large agent 130 (size, number of inputs, context window, tuning parameters, output token window, or other characteristics)). Small agents 140 can include neural networks with a comparatively smaller number of nodes and/or layers (e.g., Mixtral 46.7B, Claude 3 Haiku, GPT-3.5-Turbo, Gemini 1.0 Pro or another suitable neural network that has characteristics suitable for implementation as a small agent 140). The techniques disclosed herein can be implemented via multiple different large models, multiple different small models, a mix of both, or a singular large or small model.

In some examples, the trained neural networks (130*a*, 140*a*) can apply reasoning algorithms (130*c*, 140*c*) and/or limiters (130*d*, 140*d*) to sets of observations (130*b*, 140*b*). Observations are input features generated using the inputs 102 and/or modified inputs 110. The trained neural networks (130*a*, 140*a*) can generate outputs (135, 145), which can include, for example, conclusions and positions (135*a*, 145*a*), histories and reasoning (135*b*, 145*b*), and/or demographic information (135*c*, 145*c*). The outputs (135, 145) can therefore be traced and verified using these items, which improves experimenter ability to derive cause-effect relationships and covariances and to conduct controlled experiments by specifying or modifying characteristics of inputs 102*a* (by, for example, by adjusting simulation questions or prompts to specify population characteristics with increasing granularity).

The outputs (135, 145) can be utilized by various engines of the extractor 150. For example, a trend extraction engine 150*a* can automatically determine trends based on output characteristics, such as demographics. The focus group interview engine 150*b* can enable experimenters to simulate interviews for specific agents (130, 140). The key correlation engine 150*c* can identify correlations and demographic connections. The key quotes extractor 150*d* can extract relevant quotes and specific moments from histories and/or conclusions. The abstract positional extractor 150*e* can extract various positions and thoughts from specific agents (130, 140). The state-wise positional extractor 150*f* can extract positions and conclusions of agents (130, 140), in a quantifiable manner, in specific geographical areas. The demographic-wise positional extractor 150*g* can extract positions and conclusions of agents (130, 140), in a quantifiable manner, with respect to demographic characteristics. The key issues extractor 150*h* can identify the most used terms, topics, and so forth across instantiated agents (130, 140).

The outputs of the extractor 150 can be structured by the formatting tool 160 as key-value pairs 162, in in other suitable forms, for presentation to the user 170 via user interfaces 172 or application programming interfaces 174.

The agents, associated artificial intelligence/machine learning models, and other elements described with respect to FIG. 1 can perform various sentiment modeling platform operations described herein.

Example Computing Systems

Figure 2:
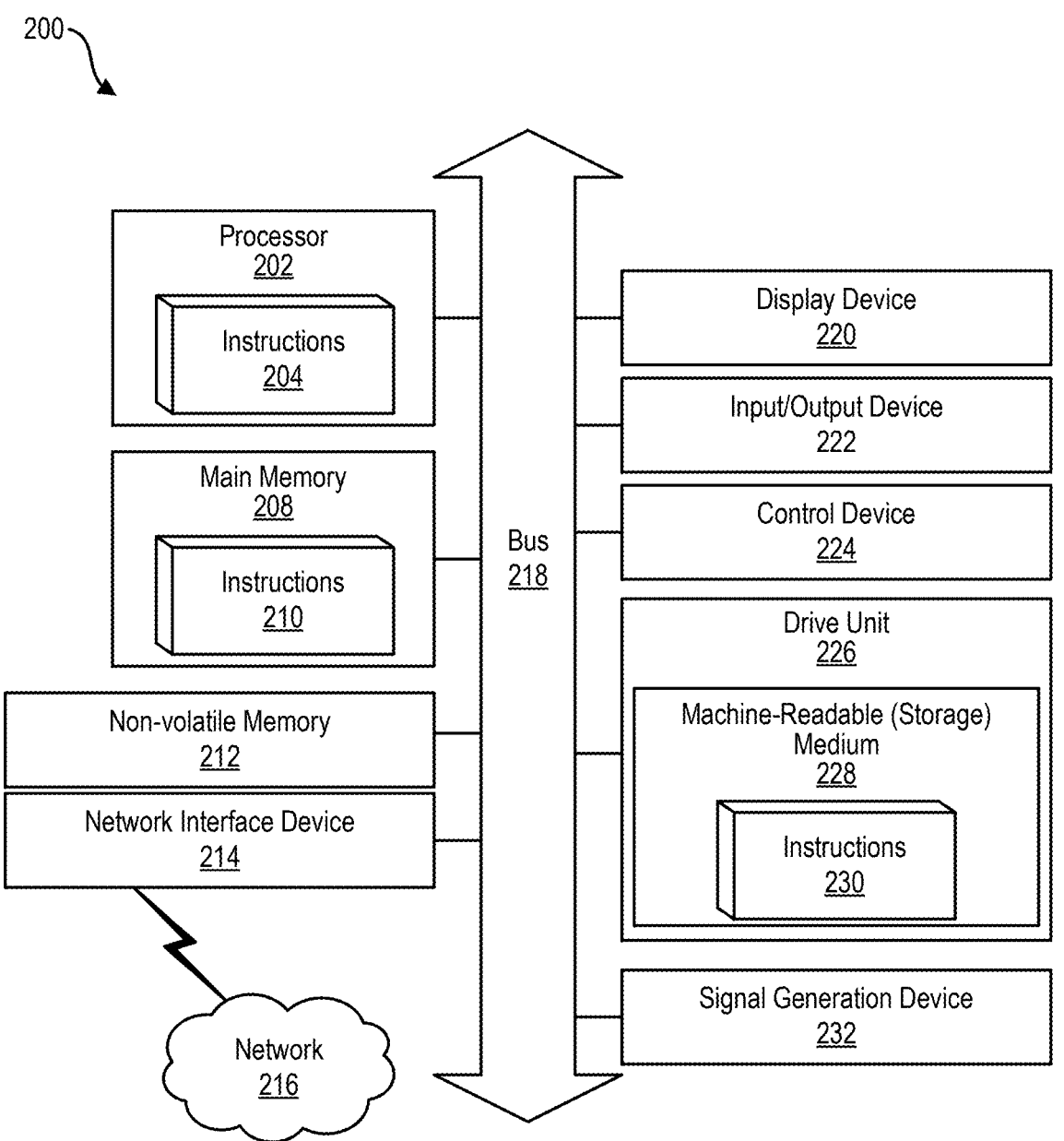
FIG. 2 is a block diagram showing some of the components typically incorporated in at least some of the computer systems and other devices on which the multi-agent simulator platform operates in accordance with some implementations of the present technology.

FIG. 2 is a block diagram showing some of the components typically incorporated in at least some of the computer systems and other devices on which the multi-agent simulator platform (e.g., the sentiment modeling platform described herein) operates in accordance with some implementations of the present technology. As shown, an example computer system 200 can include: one or more processors 202, main memory 208, non-volatile memory 210, a network interface device 214, video display device 220, an input/output device 222, a control device 224 (e.g., keyboard and pointing device), a drive unit 226 that includes a machine-readable medium 228, and a signal generation device 232 that are communicatively connected to a bus 218. The bus 218 represents one or more physical buses and/or point-to-point connections that are connected by appropriate bridges, adapters, or controllers. Various common components (e.g., cache memory) are omitted from FIG. 2 for brevity. Instead, the computer system 200 is intended to illustrate a hardware device on which components illustrated or described relative to the examples of the figures and any other components described in this specification can be implemented.

The computer system 200 can take any suitable physical form. For example, the computer system 200 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 200. In some implementations, the computer system 200 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 214 enables the computer system 200 to exchange data in a network 216 with an entity that is external to the computing system 200 through any communication protocol supported by the computer system 200 and the external entity. Examples of the network interface device 214 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 208, non-volatile memory 212, machine-readable medium 228) can be local, remote, or distributed. Although shown as a single medium, the machine-readable medium 228 can include multiple media (e.g., a centralized/distributed database and/or associated caches and servers) that store one or more sets of instructions 230. The machine-readable (storage) medium 228 can include any medium that is capable of storing, encoding, or carrying a set of instructions for execution by the computer system 200. The machine-readable medium 228 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 210, 230) set at various times in various memory and storage devices in computing device(s). When read and executed by the processor 202, the instruction(s) cause the computer system 200 to perform operations to execute elements involving the various aspects of the disclosure.

The components associated of the computer system 100 can perform various operations associated with the sentiment modeling platform disclosed herein (e.g., using the instructions 204, the processor 202, the main memory 208, and/or any other suitable components). The sentiment modeling platform can include hardware components, software components, and/or a combination thereof.

Example Computing Environments

Figure 3:
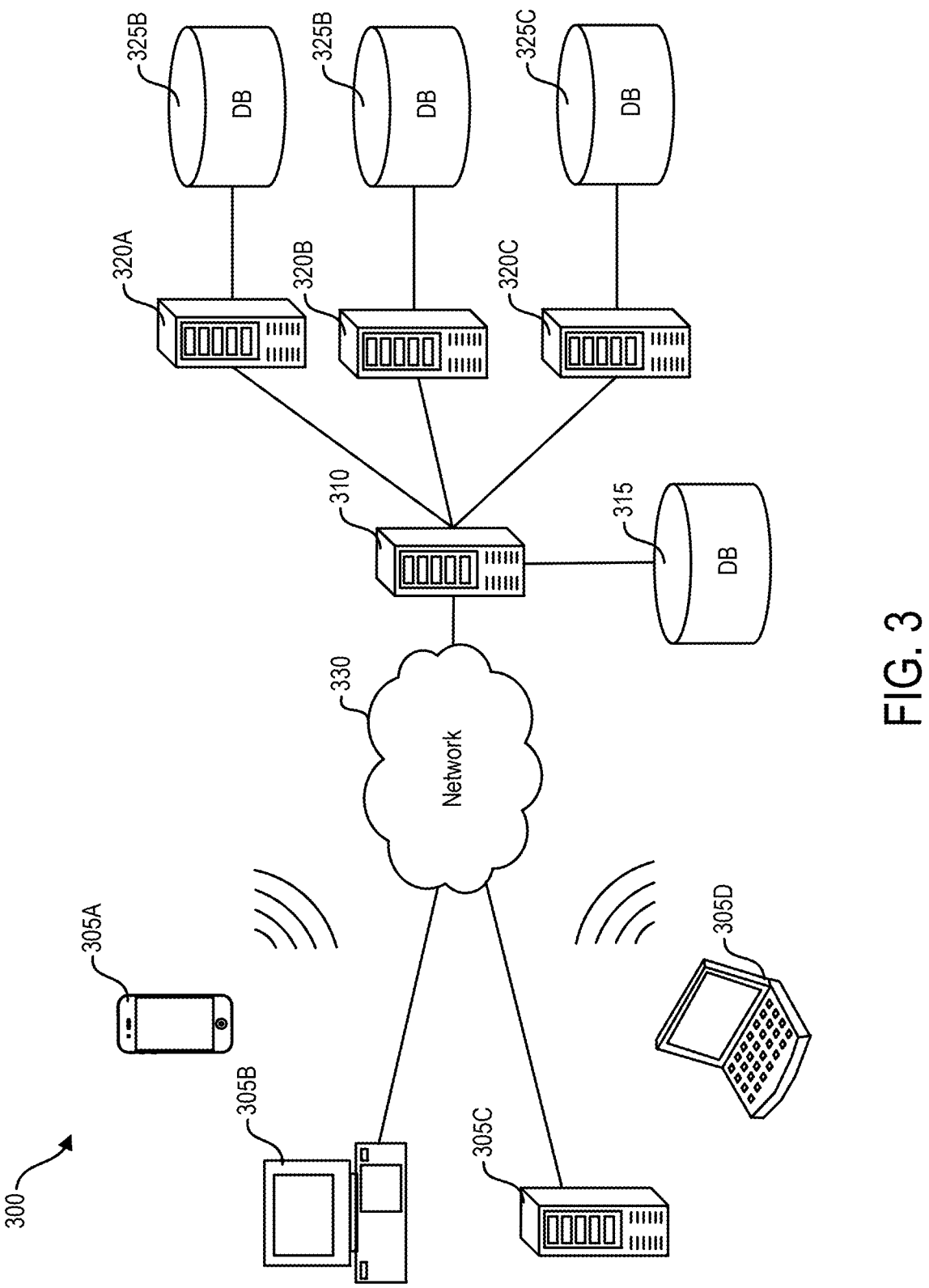
FIG. 3 is a system diagram illustrating an example of a computing environment in which the multi-agent simulator platform operates in some implementations of the present technology.

FIG. 3 is a system diagram illustrating an example of a computing environment in which the multi-agent simulator platform (e.g., the sentiment modeling platform) operates in some implementations of the present technology. In some implementations, environment 300 includes one or more client computing devices 305A-D, examples of which can host various components of the multi-agent simulator platform of FIG. 1. Client computing devices 305 operate in a networked environment using logical connections through network 330 to one or more remote computers, such as a server computing device.

In some implementations, server 310 is an edge server which receives client requests and coordinates fulfillment of those requests through other servers, such as servers 320A-C. In some implementations, server computing devices 310 and 320 comprise computing systems. Though each server computing device 310 and 320 is displayed logically as a single server, server computing devices can each be a distributed computing environment encompassing multiple computing devices located at the same or at geographically disparate physical locations. In some implementations, each server 320 corresponds to a group of servers.

Client computing devices 305 and server computing devices 310 and 320 can each act as a server or client to other server or client devices. In some implementations, servers (310, 320A-C) connect to a corresponding database (315, 325A-C). As discussed above, each server 320 can correspond to a group of servers, and each of these servers can share a database or can have its own database. Databases 315 and 325 warehouse (e.g., store) information such as inputs, libraries, configuration data, agent outputs, extracted data and so forth. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN) or a wide area network (WAN), but can also be other wired or wireless networks. In some implementations, network 330 is the Internet or some other public or private network. Client computing devices 305 are connected to network 330 through a network interface, such as by wired or wireless communication. While the connections between server 310 and servers 320 are shown as separate connections, these connections can be any kind of local, wide area, wired, or wireless network, including network 330 or a separate public or private network.

For example, the sentiment modeling platform disclosed herein can reside within server computing devices 310 or 320A-320C and/or can utilize databases 315 or 325A-325C. Additionally or alternatively, the client computing devices 305A-305C can perform various operations of the sentiment modeling platform. The sentiment modeling platform can reside in a single device and/or across multiple devices (e.g., in a distributed architecture). The sentiment modeling platform can include hardware components, software components, and/or a combination thereof.

Example AI/ML Stack

Figure 4:
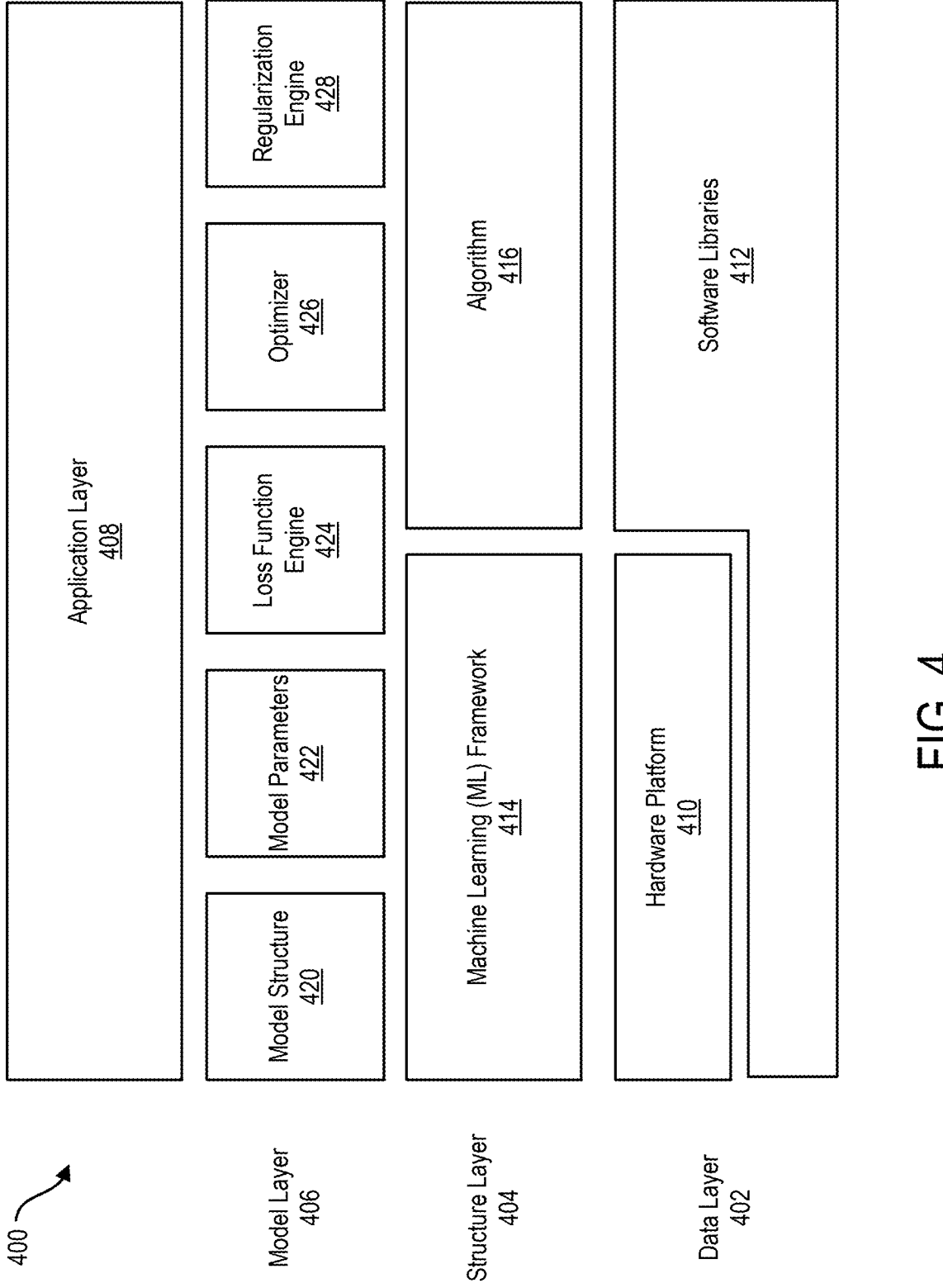
FIG. 4 is a system diagram illustrating an example AI/ML stack of the multi-agent simulator platform, according to some arrangements.

FIG. 4 is a block diagram illustrating an example AI/ML stack 400 of the platform, according to some arrangements. According to various implementations, the AI/ML stack can include AI/ML models, such as large agent models, small agent models, or additional AI/ML models.

As shown, the AI stack can include a set of layers, which conceptually organize elements within an example network topology for the AI system's architecture to implement a particular AI model. Generally, an AI model is a computer-executable program implemented by the AI stack that analyzes data to make predictions. Information can pass through each layer of the AI stack to generate outputs for the AI model. The layers can include a data layer 402, a structure layer 404, a model layer 406, and an application layer 408. The algorithm 416 of the structure layer 404 and the model structure 420 and model parameters 422 of the model layer 406 together form an example AI model. The optimizer 426, loss function engine 424, and regularization engine 428 work to refine and optimize the AI model, and the data layer 402 provides resources and support for application of the AI model by the application layer 408. The application layer 408 can include, in whole or in part, executables included in an application that enables users to access and interact with the platform (such as, for example, user interfaces).

The data layer 402 acts as the foundation of the AI stack by preparing data for the AI model. As shown, the data layer 402 can include two sub-layers: a hardware platform 410 and one or more software libraries 412. The hardware platform 410 can perform operations for the AI model and include computing resources for storage, memory, logic and networking. The hardware platform 410 can perform back-end operations such as matrix calculations, parallel calculations, machine learning (ML) training, and the like. Examples of components used by the hardware platform 410 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 410 can include Infrastructure as a Service (IaaS) resources, which are computing resources (e.g., servers, memory, etc.) offered by a cloud services provider. The hardware platform 410 can also include computer memory for storing data about the AI model, application of the AI model, and training data for the AI model. The computer memory can be a form of random-access memory (RAM), such as dynamic RAM, static RAM, and non-volatile RAM.

The software libraries 412 can be thought of as suites of data and programming code, including executables, used to control the computing resources of the hardware platform 310. The programming code can include low-level primitives (e.g., fundamental language elements) that form the foundation of one or more low-level programming languages, such that the hardware platform 410 can use the low-level primitives to carry out specific operations. The low-level programming languages do not require much, if any, abstraction from a computing resource's instruction set architecture, allowing them to run quickly with a small memory footprint. Examples of software libraries 412 that can be included in the AI stack include Intel Math Kernel Library, Nvidia cuDNN, Eigen, and Open BLAS.

The structure layer 404 can include an ML framework 414 and one or more of an algorithm 416. The ML framework 414 can be thought of as an interface, library, or tool that allows users to build and deploy the AI model. The ML framework 414 can include an open-source library, an application programming interface (API), a gradient-boosting library, an ensemble method, and/or a deep learning toolkit that can work with the layers of the AI system facilitate development of the AI model. For example, the ML framework 414 can be invoked to distribute processes for application or training of the AI model across multiple resources in the hardware platform 410. The ML framework 414 can also include a set of pre-built components that have the functionality to implement and train the AI model and allow users to use pre-built functions and classes to construct and train the AI model. Thus, the ML framework 414 can be used to facilitate data engineering, development, hyperparameter tuning, testing, and training for the AI model. Examples of ML frameworks 314 that can be used in the AI stack include TensorFlow, PyTorch, Scikit-Learn, Keras, Cafffe, LightGBM, Random Forest, and Amazon Web Services.

The algorithm 416 can be an organized set of computer-executable operations used to generate output data from a set of input data and can sometimes be described using pseudo-code. The algorithm 416 can include complex code that allows the computing resources to learn from new input data and create new/modified outputs based on what was learned.

The algorithm 416 can build the AI model through being trained (e.g., via a model training engine, which can include a user interface having controls sufficient to enable a user to interact with the model, label data, and so forth) while running computing resources of the hardware platform 410. This training allows the algorithm 416 to make predictions or decisions without being explicitly programmed to do so. Once trained, the algorithm 416 can run at the computing resources as part of the AI model to make predictions or decisions, improve computing resource performance, or perform tasks. The algorithm 416 can be trained using supervised learning, unsupervised learning, semi-supervised learning, and/or reinforcement learning.

The model layer 406 can implement the AI model using data from the data layer and the algorithm 416 and ML framework 414 from the structure layer 404, thus enabling decision-making capabilities of the AI stack. The model layer 406 can include any of a model structure 420, model parameters 422, a loss function engine 424, an optimizer 426, and a regularization engine 428.

The model structure 420 describes the architecture of the AI model of the AI stack. The model structure 420 defines the complexity of the pattern/relationship that the AI model expresses. Examples of structures that can be used as the model structure 420 include decision trees, support vector machines, regression analyses, Bayesian networks, Gaussian processes, genetic algorithms, and artificial neural networks (or, simply, neural networks). The model structure 420 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 420 may include one or more hidden layers of nodes between the input and output layers. The model structure 420 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, Variational Autoencoder (VAE), and Generative Adversarial Networks (GANs).

In some examples, neural networks can implement computer vision algorithms. Computer vision algorithms can perform object detection, object localization, semantic segmentation, pose estimation, and similar tasks. For example, to perform two-step object detection, a Region Proposal Network (RPN) can generate a set of candidate regions that may contain a particular object. The region proposals (e.g., sets of pixel coordinates) can then be passed to a neural classifier network. To perform one-step object detection, a neural network can combine the object detection and classification steps. Once identified, objects can be localized. For example, objects can be marked with a bounding box, which can be, for example, identified by a convolutional neural network that generates a set of at least three coordinates in a particular pixel space. Further, semantic segmentation can be applied by convolutional neural networks to objects identified by the bounding boxes to identify regions of objects.

In some examples, neural networks can implement generative algorithms. Examples of neural networks that can implement generative algorithms include deep learning models, such as GANs, VAEs, and/or diffusion models.

In one example, to generate an image that includes a specified input object (for example, an object identified by a CNN), a computing platform can utilize a GAN. An example GAN consists of two neural networks: a generator and a discriminator. The generator can create new data instances, such as images, while the discriminator can evaluate them for authenticity. To include an input object in the generated image, the GAN can be trained using the input object as a conditioning variable. The conditioning variable can provide information to the generator about the specific object that should be included in the generated image. By learning about the input object as a conditional input during the training process, the generator can learn to produce images that incorporate the specified object. Once trained, the generator can take the input object and produce an image that includes the input object, based on the learned associations and patterns in the training data. This process allows GANs to generate images that contain specific input objects.

In another example, to generate an image that includes the specified input object, a computing platform can utilize a VAE. A VAE can be conditioned on the input object during the encoding and decoding process. The conditioning allows the VAE to learn the correlations between the input object and the corresponding image features. During generation, the conditioned VAE can produce an image that includes the specified object.

In another example, to generate an image that includes the specified input object, a computing platform can utilize a diffusion model. A diffusion model can iteratively update a set of pixel values to maximize the likelihood of the specified input object being present in the generated image. The diffusion process involves propagating the information regarding the input object through the image and influencing the generation of each pixel based on the conditional input that can include the specified input object. By iteratively applying the diffusion process, the model can generate an image that incorporates the specified input object.

The model parameters 422 represent the relationships learned by a model during training and can be used to make predictions and decisions based on input data. The model parameters 422 can weight and bias the nodes and connections of the model structure 420. For instance, when the model structure 420 is a neural network, the model parameters 422 can weight and bias the nodes in each layer of the neural networks, such that the weights determine the strength of the nodes and the biases determine the thresholds for the activation functions of each node. The model parameters 422, in conjunction with the activation functions of the nodes, determine how input data is transformed into desired outputs. The model parameters 422 can be automatically determined and/or altered during training of the algorithm 416.

The loss function engine 424 can determine a loss function, which is a metric used to evaluate the AI model's performance during training. For instance, the loss function engine 424 can measure the difference between a predicted output of the AI model and the actual output of the AI model and is used to guide optimization of the AI model during training to minimize the loss function. The loss function may be presented via the ML framework 414, such that a user can determine whether to retrain or otherwise alter the algorithm 416 if the loss function is over a threshold. In some instances, the algorithm 416 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 426 adjusts the model parameters 422 to minimize the loss function during training of the algorithm 416. In other words, the optimizer 426 uses the loss function generated by the loss function engine 424 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 426 used may be determined based on the type of model structure 420 and the size of data and the computing resources available in the data layer 402.

The regularization engine 428 executes regularization operations. Regularization is a technique that prevents over- and under-fitting of the AI model. Overfitting occurs when the algorithm 416 is overly complex and too adapted to the training data, which can result in poor performance of the AI model. Underfitting occurs when the algorithm 416 is unable to recognize even basic patterns from the training data such that it cannot perform well on training data or on validation data. The optimizer 426 can apply one or more regularization techniques to fit the algorithm 416 to the training data properly, which helps constrain the resulting AI model and improves its ability for generalized application. Examples of regularization techniques include lasso (L1) regularization, ridge (L2) regularization, and elastic (L1 and L2 regularization).

The sentiment modeling platform can include and/or utilize one or more components of the AI/ML stack 400, as described in relation to FIG. 4. For example, the sentiment modeling platform uses components of FIG. 2 or 3, as described above, to execute one or more instructions (e.g., instructions 204 or 210 of FIG. 1) using components of the AI/ML stack 400 of FIG. 4.

Sentiment Modeling Framework Using Example Control and Data Entities

Figure 5:
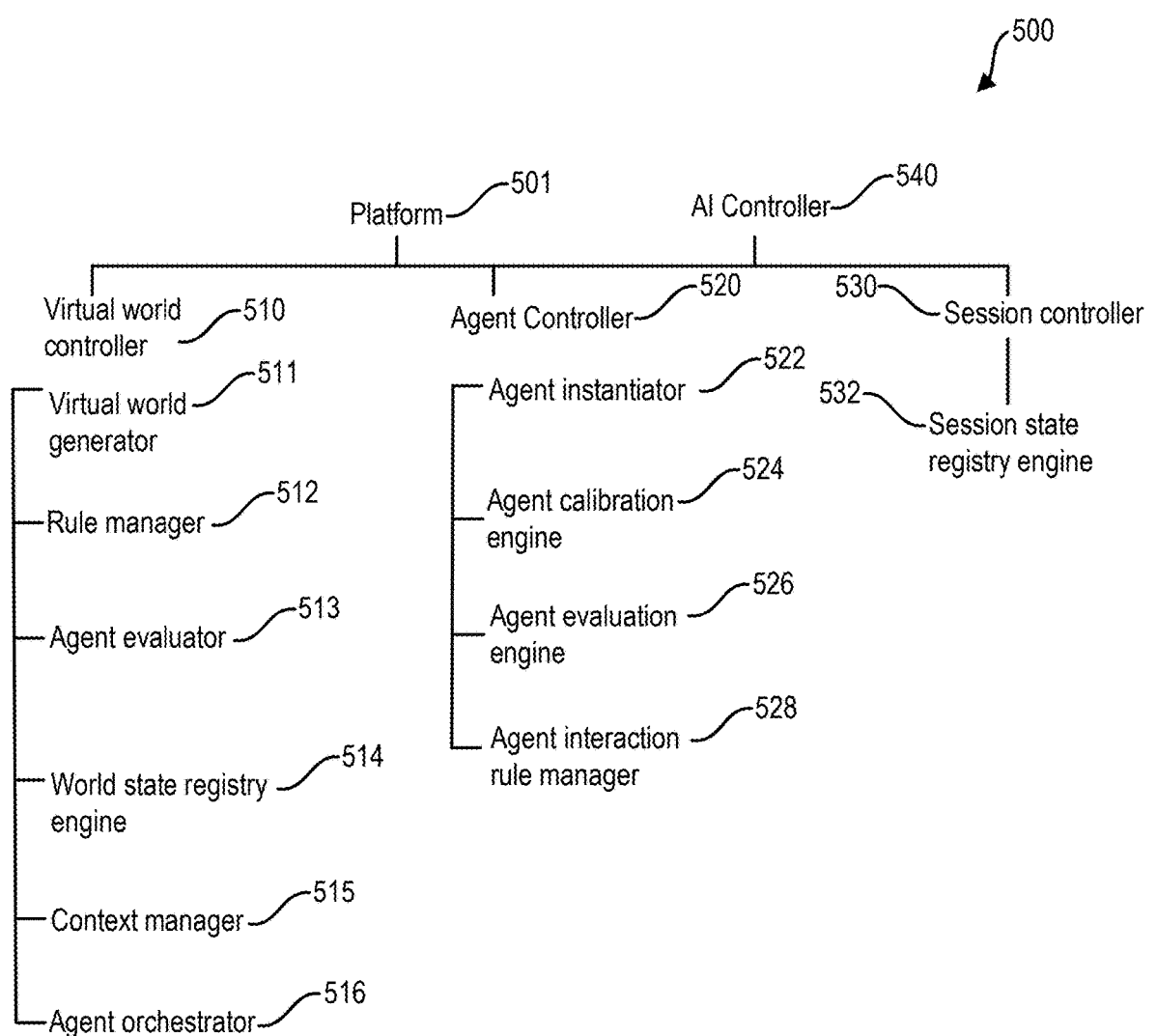
FIG. 5 is an architecture diagram showing example control entities in the multi-agent simulator platform, according to some arrangements.
Figure 6:
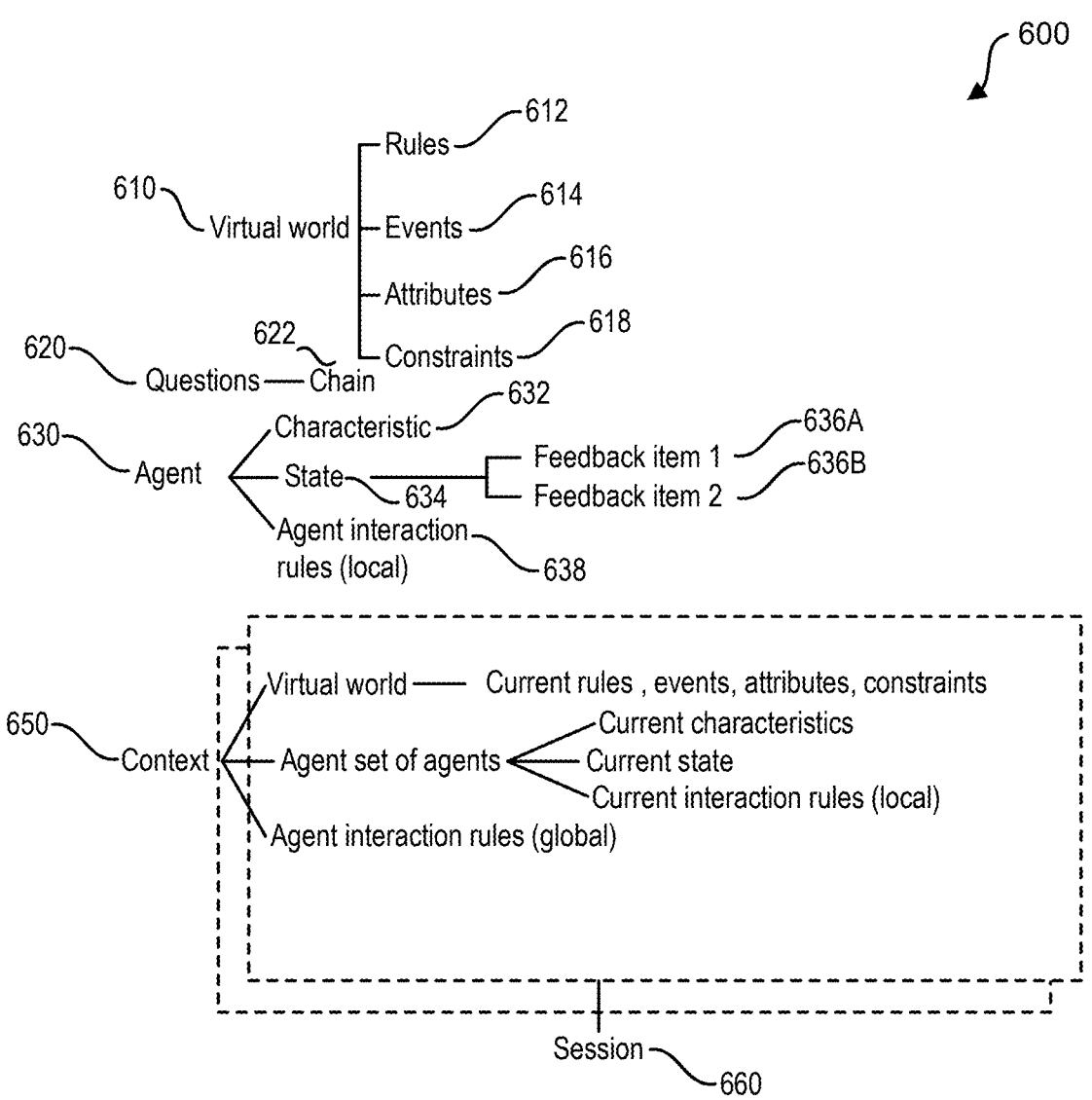
FIG. 6 is a block diagram showing example data entities in the multi-agent simulator platform, according to some arrangements.

FIG. 5 is an architecture diagram showing example control entities 500 in the multi-agent simulator platform (e.g., the sentiment modeling platform), according to some arrangements, and FIG. 6 is a block diagram showing example data entities 600 in the multi-agent simulator platform, according to some arrangements. One of skill will appreciate that, in various implementations, control entities 500 and data entities 600 can be omitted and/or combined at least in part. In some implementations, for example, data entities can include control entities (e.g., when implemented as executables that include compiled code in an object-oriented language, where a class (e.g., a data entity 600) can include both data declarations and functions (e.g., control entities 500). More generally, control entities 500 are executable components that govern the behavior of the multi-agent simulator platform, such as simulation logic, agent decision-making, and interaction protocols, and data entities 600 are data structures that store and manage data used by the platform, such as agent attributes, simulation parameters, and output results. Throughout simulation sessions, agents can evolve by adapting to the changing world.

As shown, data entities can include one or more of each of a virtual world 610, question 620, agent 630, context 650 and session 660. Entities can have properties, which can be implemented as records, relational tables, items in key-value pairs, tags, labels, metadata, or in another suitable form.

Properties of a particular virtual world 610 entity can include rules 612, events 614, attributes 616, and constraints 618. Properties of a particular question 620 entity can include question chains 622. Properties of a particular agent 630 entity can include agent characteristics 632 (e.g., traits), agent state 634, agent feedback items (636a, 636b), and local agent interaction rules 638. Properties of a particular context 650 entity can include, for each of a set of sessions 660 included in the context 650, state of the virtual world, sets of agents used in a particular set of simulation sessions, sets of current agent characteristics, states, and local interaction rules, sets of global agent interaction rules, and so forth.

Correspondingly, the platform can include a virtual world controller 510, which can include a virtual world generator 511, rules manager 512, agent evaluator 513, world state registry engine 514, context manager 515, and agent orchestrator 516. The platform can include an agent controller 520, which can include an agent instantiator 522, agent calibration engine 524, agent evolution engine 526, and agent interaction rule manager 528. The platform can include a session controller 530, which can include a session state registry engine 532. The platform can also include an AI controller 540 (e.g., controller 120 of FIG. 1), which can manage model configurations, federated learning functions, and other training.

The virtual world controller 510 manages the virtual world 610, which includes rules 612, events 614, attributes 616, and constraints 618. Rules 612 are predefined conditions that govern the behavior of agents within the virtual world, such as laws, norms, or physical laws. Events 614 are occurrences that take place within the virtual world, such as changes in agent state or interactions between agents. Attributes 616 are characteristics of the virtual world, such as geography, climate, or economic conditions. Constraints 618 are limitations or restrictions on the behavior of agents within the virtual world, such as resource limitations or physical barriers. The state of the virtual world refers to the current status of the world's attributes, events, and agent interactions at a particular point in time, including, for example, the current geography, climate, economic conditions, agent locations, and agent actions. The virtual world controller 510 includes a virtual world generator 511, which creates the virtual world based on the defined rules, events, attributes, and constraints. The rules manager 512 ensures that the rules are enforced within the virtual world. The agent evaluator 513 assesses the behavior of agents within the virtual world. The world state registry engine 514 tracks the current state of the virtual world. The context manager 515 manages the context in which the virtual world is simulated. The agent orchestrator 516 coordinates the interactions between agents within the virtual world.

The agent controller 520 manages the agent 630, which includes agent characteristics 632, agent state 634, agent feedback items (636a, 636b), and local agent interaction rules 638. Agent characteristics 632 are the properties that define an agent, such as traits, skills, knowledge, attitudes, and experiences. Agent state 634 refers to the current status of the agent's characteristics, actions, and interactions at a particular point in time (i.e. for a particular simulation session). Agent feedback items (636a, 636b) are the responses or reactions of the agent to events or interactions within the virtual world. Local agent interaction rules 638 are the rules that govern the behavior of the agent in interactions with other agents, such as rules for communication, cooperation, or competition. For example, a local agent interaction rule 638 might specify that an agent will only communicate with other agents that share similar characteristics or goals. Local action interaction rules 638 can also include logic (e.g., executables, circuits) for invoking models for the agents to perform tasks in response to questions 620. In some implementations, local agent interaction rules 638 can include model selection logic (e.g., selecting a model based on the type of output (qualitative or quantitative), modality of output, or other parameters). The agent controller 520 includes an agent instantiator 522, which creates instances of agents based on the defined agent characteristics. The agent calibration engine 524 adjusts the agent's characteristics and behavior to match the desired simulation parameters, such as calibrating the agent's decision-making process to match statistical distributions of human decision-making, like a normal distribution for risk tolerance or a power law distribution for social network connections. The agent evolution engine 526 updates the agent's characteristics and behavior over time based on interactions and events within the virtual world. The agent interaction rule manager 528 ensures that the local agent interaction rules are enforced during agent interactions.

In some implementations, the multi-agent simulator platform determines and/or generates agent traits. Agent traits can include characteristics defining individual agents and/or groups of agents within the virtual world (e.g., demographic, socioeconomic, and/or behavioral attributes). In some implementations, agent traits include agent interaction rules. For example, an agent trait includes a role (e.g., profession) indicator, an institution identifier (e.g., for an administrative board, academic institution, company, firm, etc.), an age value, a salary value, a residence address identifier (e.g., a suitable geographical indicator), a political affiliation identifier, a customer sentiment value, and/or an educational attainment identifier. In some implementations, agent traits include timeseries and/or complex data integrating events and/or behaviors associated with a particular agent (e.g., a previous transaction history, political engagement history, voting history, etc.). In some implementations, the multi-agent simulator platform determines agent traits based on external data, such as census data, customer sentiment data, associated demographic data, and/or real-world data associated with user behavior. As such, agent traits enable creation of diverse and representative simulated populations reflecting dynamically updated, real-world demographic distributions, news, or economic developments, thereby improving the accuracy and applicability of a particular simulation.

The context manager 515 manages the context 650, which includes the state of the virtual world, sets of agents used in a particular set of simulation sessions, sets of current agent characteristics, states, and local interaction rules, sets of global agent interaction rules, and so forth. Global agent interaction rules are rules that govern the behavior of all agents within the virtual world, such as rules for resource allocation, conflict resolution, or information sharing. For example, a global agent interaction rule might specify that agents must share information about certain world events (e.g., environmental hazards) or that agents cannot allocate more than a certain percentage of resources to a single task. The context 650 provides the environment and parameters within which the simulation is run, including the specific virtual world, agents, and rules used. The context manager 515 ensures that the context is properly set up and configured for each simulation session. The context manager 515 also tracks changes to the context over time and updates the simulation accordingly.

In some implementations, the multi-agent simulator platform generates the virtual world according to an input configuration and/or data schema. For example, operations described herein enable the platform to create a virtual world that is consistent with specified environmental conditions, agent population characteristics, interaction rules between the various agents, and simulation constraints. For example, the data schema defines details and/or characteristics associated with items of the simulation, such as representations of marketing strategies, logos, and/or coffee cups. In some implementations, the multi-agent simulator platform can receive information relating to the configuration of the virtual world (e.g., data for the input configuration) directly from a user of the platform (e.g., via a GUI). Additionally or alternatively, the configuration is inferred from external sources, such as news sources, social media, census data, and/or other suitable sources. In some implementations, the disclosed operations can generate the input configuration (e.g., thereby configuring the virtual world) by inferring conditions based on the external sources (e.g., an inference of a recession-like environment based on economic news, or demographic distributions based on census data).

An external source can include third-party information repositories, databases, or services. For example, external sources provide real-world data to inform agent behavior, simulation constraints, and hypothesis generation (e.g., for generation of an input configuration) within the multi-agent simulator platform. The external data can include static data and/or time-series data. The external sources can include external data, such as economic data (e.g., from the Bureau of Labor Statistics), such as unemployment rates, or consumer price indices. In some implementations, external data includes news data, such as financial news feeds, political news feeds, market analysis reports, and social media feed data. In some implementations, external data includes retail data, such as data from retail sales databases (e.g., of prior sales figures from previous years or seasons, transaction volumes, and/or pricing information). In some implementations, external data includes environment data, such as weather-related data (e.g., from weather services that provide environmental conditions). The external data can include census data (e.g., providing demographic distributions). The external data can include regulatory information, such as compliance requirements, legal requirements, and/or policy information. For example, the regulatory information can include information relating to the composition of particular administrative agencies, boards, and/or associated agent information (e.g., to aid in simulation of agents within the virtual world).

In some implementations, the multi-agent simulator platform enables retrieval of external data and/or subsequent inferring of conditions based on data-source identifiers. Data-source identifiers can include references or addresses specifying external data sources from which the multi-agent simulator platform can retrieve real-world information to inform simulation parameters and agent behavior (e.g., via inferences). For example, a data-source identifier includes a uniform resource locator (URL) associated with an application programming interface (API) that enables accessing particular websites (e.g., retail sales databases) and/or other computational resources associated with external data sources. Data-source identifiers enable standardized data retrieval protocols that can be consistently applied across different external data sources, facilitating the integration of diverse data types for incorporation and/or inference with respect to simulation sessions (e.g., in generation of input configurations).

Consider an example use case. In this example, to investigate the popularity of espresso drinks that are associated with a particular logo and slogan with the morning crowd in the state of New York (e.g., in response to an experimenter question "How popular are espresso drinks, with a cup design that includes the attached logo and slogan, with the morning crowd in the state of New York?"), a virtual world is initialized using the virtual world controller 510. The virtual world generator 511 creates a virtual environment that simulates the morning commute in various cities across New York, including characteristics such as demographics, transportation modes, and coffee shop locations. The rules manager 512 ensures that predefined conditions, such as the availability of coffee shops, different marketing strategies associated with the different coffee shops, and the demographics of the morning crowd, are enforced within the virtual world. The world state registry engine 514 tracks the current state of the virtual world, including the location and behavior of agents representing coffee shop customers.

The agent controller 520 instantiates agents within the virtual world, each representing a coffee shop customer with characteristics such as age, income, and coffee preferences. The agent instantiator 522 creates instances of agent entities 630, which are calibrated using the agent calibration engine 524 to match statistical distributions of coffee consumption habits in New York. For example, the agents' coffee preferences are calibrated to match data from surveys or market research on coffee consumption in New York.

The context manager 515 configures the context for the simulation session, defining the parameters and conditions that govern the simulation's execution. The context includes the state of the virtual world, sets of agents used, sets of current agent characteristics, states, and local interaction rules, and global agent interaction rules that govern the behavior of agents in coffee shops. For example, a global agent interaction rule might specify that agents will only purchase coffee from shops that offer their preferred type of coffee or from shops that have a slogan or logo that is sufficiently "catchy" or compelling to the particular agent.

With the virtual world, agents, and context configured, the simulation can be executed to investigate the popularity of espresso drinks, with a particular logo, slogan, or cup design, with the morning crowd in New York. The agent orchestrator 516 coordinates the interactions between agents within the virtual world, ensuring that local agent interaction rules are enforced as agents interact with coffee shops and other agents. The simulation output can be analyzed to estimate the sentiment and associated demand for espresso drinks in different cities across New York, providing insights for coffee shop owners, marketers, and researchers. For example, the generated sentiment can include agents' reactions to particular attributes of the logos, slogans, and/or cup design of the different coffee shops and the associated change in demand for coffee of that particular coffee shop.

The agents, associated artificial intelligence/machine learning models, and other elements described with respect to FIGS. 5 and 6 can perform various sentiment modeling platform operations described herein (e.g., using one or more components of FIG. 1-4).

Example Sentiment Modeling Operations

Figure 7:
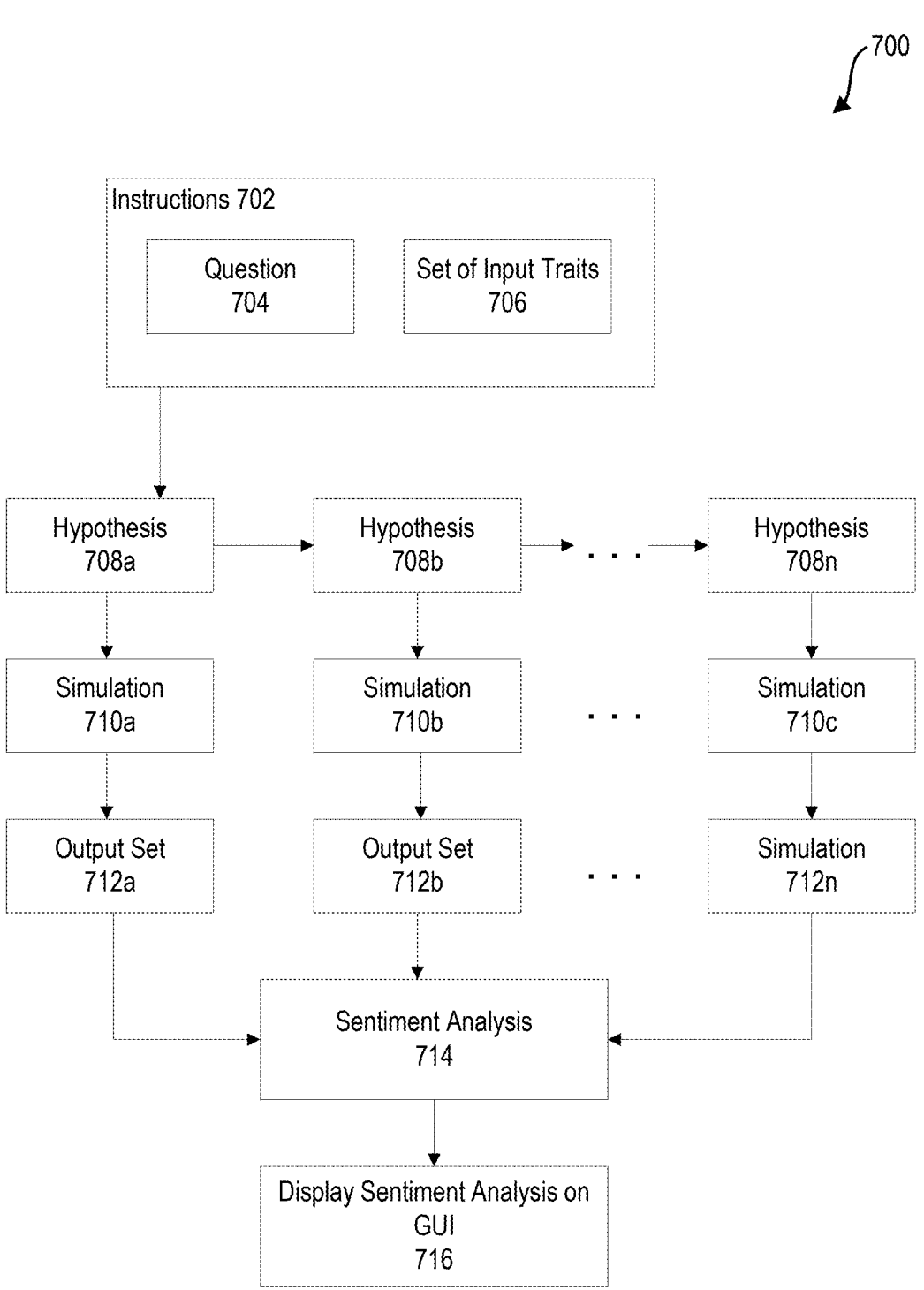
FIG. 7 is a block diagram showing a flow for generating a sentiment analysis based on multiple generated hypotheses, according to some arrangements.

FIG. 7 is a block diagram 700 showing an example flow for generating a sentiment analysis based on multiple generated hypotheses, according to some arrangements. The disclosed operations enable efficient and flexible testing of multiple scenarios by generating and evaluating multiple hypotheses within a single simulation framework. The approach enables rapid iteration and comparison of different scenarios, thereby providing valuable insights into how changes in input parameters (e.g., associated with different attributes of logos associated with a marketing strategy, such as colors or contrast) can affect agent sentiment and behavior. By processing multiple hypotheses, the platform can capture nuanced differences in agent responses across various scenarios.

The sentiment modeling platform (e.g., using one or more components described with respect to FIGS. 1-6) can receive instructions 702 (e.g., from an experimenter/platform user) that include a question 704 and a set of input traits 706. From the instructions, the platform can generate multiple hypotheses (708a, 708b-708n) based on variations of the input data. The platform can use the hypothesis to execute a corresponding simulation (710a, 710b-710n) resulting in respective output sets (712a, 712b-712n). The sentiment modeling platform, at operation 714, can aggregate the output sets from each simulation and process the output sets to perform a sentiment analysis by extracting and analyzing information from the agent responses to the hypotheses. The sentiment modeling platform can display the results of the sentiment analysis on a GUI at operation 716.

Figure 8:
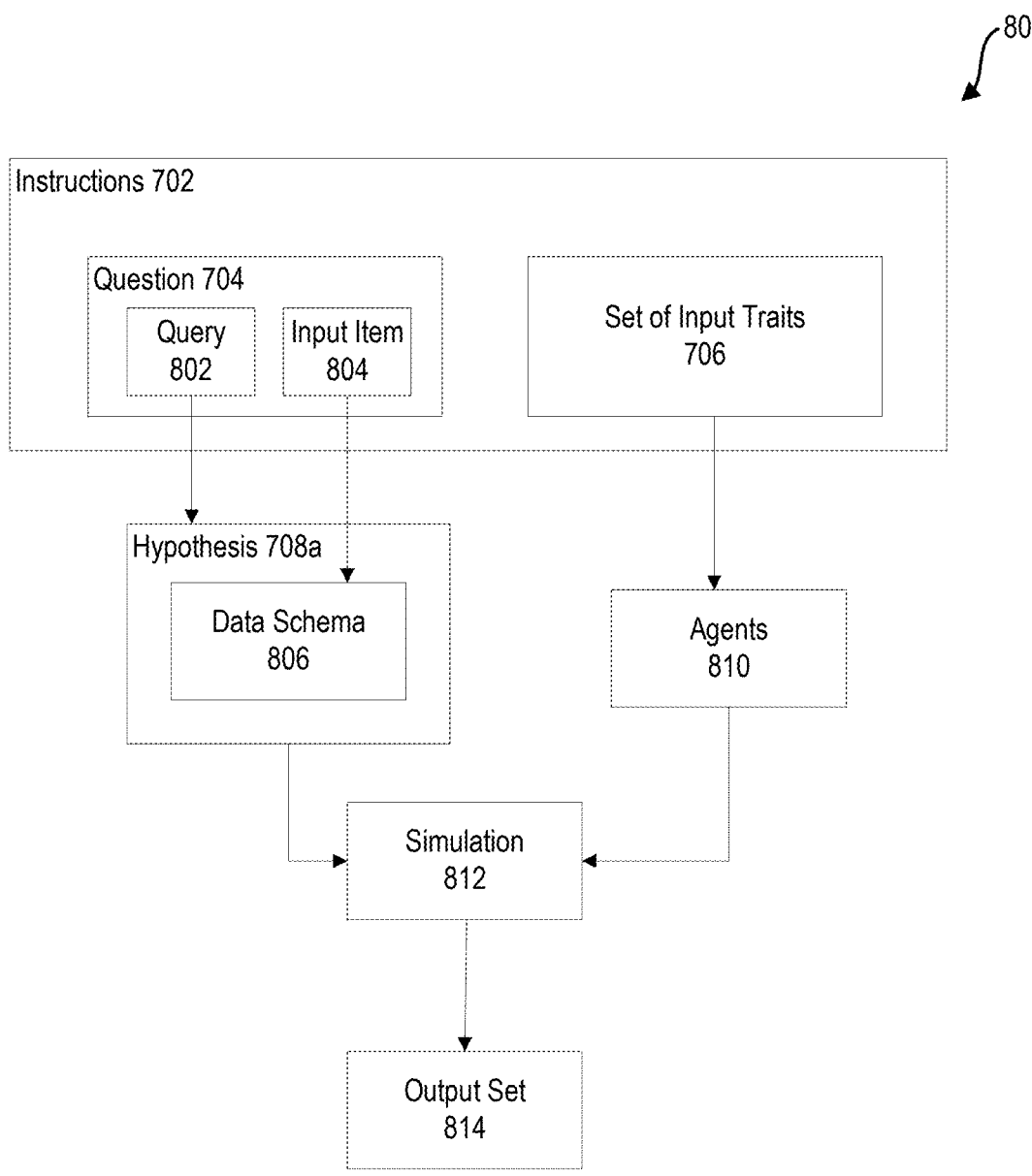
FIG. 8 is a block diagram showing a flow for generating an output set based on a hypothesis and associated data schema, according to some arrangements.

FIG. 8 is a block diagram showing a flow for generating an output set based on a hypothesis and associated data schema, according to some arrangements. For example, the sentiment modeling platform (e.g., using one or more components described with respect to FIGS. 1-6) receives the instructions 702 that include the question 704, including a query 802 and an input item 804. The platform can generate a data schema 806 based on the input item 804 and generate a corresponding hypothesis 708a (e.g., based on the query 802 and/or the input item 804 or data schema 806). The platform can instantiate agents 810 based on the set of input traits 706 and execute the simulation 812 based on the hypothesis 708a, thereby generating a corresponding output set 814 associated with the instantiated agents 810 within the simulation 812. As such, the disclosed operations enable generation of outputs associated with the simulation of a virtual world with agents therein, thereby enabling complex predictions of agent sentiment (e.g., representing consumer sentiment).

The instructions 702 can include data of one or more data formats from a user of the platform (e.g., an experimenter). The instructions can include a question representing a query (e.g., associated with a marketing strategy, an economic strategy, a political strategy, and/or any other question relating to a simulation of a virtual world) and/or an associated input item (e.g., an logo, slogan, or any other data structure, including images, videos, audio data, and/other suitable data).

The query 802 can include a simulation request in one or more formats (e.g., textual, visual, audiovisual and/or audio-based). For example, the query 802 can include a request for a reaction, opinion, and/or response associated with a scenario (e.g., a hypothesis, stimulus and/or another suitable occurrence) relating to one or more components of a world. In some implementations, the query relates to one or more input items 804. An input item can include data of any particular format (e.g, an image, video, audio, multimedia and/or other suitable data) associated with the query. To illustrate, the question 704 can include a query asking about consumers' reactions to a new marketing strategy, where the new marketing strategy is represented via one or more corresponding input items (e.g., an image file of an associated logo, a text string for an associated slogan, and/or a 3D model of an associated product).

In some implementations, an input (e.g., a user input) includes a seed phrase, a preliminary question, and/or associated natural language tokens (e.g., associated with the query 802). For example, a user input includes a textual input (e.g., a search term) that enables tuning and/or generation of simulation parameters and/or configurations within the multi-agent simulator platform. As an illustrative example, a seed phrase associated with a user input includes, "holiday shopping sentiment analysis in New York" or "political sentiment analysis for election campaigns." In some implementations, the seed phrase includes an indication of one or more constraints associated with a desired simulation (e.g., a geographical constraint, such as New York, and/or other constraints associated with a virtual world, simulation session, and/or associated agents). Receiving (e.g., from a user device and/or associated GUI) a seed phrase enables the automated generation of contextually relevant simulation parameters (e.g., agent traits, world/environment parameters or constraints, agent interaction rules, etc.) based on minimal user input, improving the versatility and efficiency of the deployment of multi-agent simulations across diverse scenarios without requiring extensive technical expertise from users.

In some implementations, the multi-agent simulator platform enables generation of a preliminary question, such as a question associated with a user input. For example, based on a user input specifying "holiday shopping sentiment analysis in New York," the multi-agent simulator platform generates a preliminary question including "How do consumers from Manhattan and Brooklyn respond to holiday promotions?" The multi-agent simulator platform can generate a representation of the preliminary question for display on a GUI. The user can subsequently modify the preliminary question (e.g., via an associated user control on the GUI, such as a text box). For example, the user can modify the question to include and/or tune constraints desired to be incorporated within the simulation. To illustrate, the modified question is "How do consumers from Manhattan and Brooklyn respond to buy-one-get-one-free promotions on Black Friday weekend in the context of online shopping?" As such, preliminary questions enable user-driven refinement of simulation scenarios that incorporate domain expertise and specifications within a particular hypothesis and/or associated simulation session, enabling iterative hypothesis development combining automated question generation with human supervision and refinement.

In another example use case, a user input includes a textual input (e.g., a search term) that enables tuning and/or generation of simulation parameters and/or configurations within the multi-agent simulator platform. As an illustrative example, a seed phrase associated with a user input includes, "holiday shopping sentiment analysis in New York" or "political sentiment analysis for election campaigns." In some implementations, the seed phrase includes an indication of one or more constraints associated with a desired simulation (e.g., a geographical constraint, such as New York, and/or other constraints associated with a virtual world, simulation session, and/or associated agents). Receiving (e.g., from a user device and/or associated GUI) a seed phrase enables the automated generation of contextually relevant simulation parameters (e.g., agent traits, world/environment parameters or constraints, agent interaction rules, etc.) based on minimal user input, improving the versatility and efficiency of the deployment of multi-agent simulations across diverse scenarios without requiring extensive technical expertise from users.

In some implementations, the multi-agent simulator platform enables generation of a preliminary question, such as a question associated with a user input. For example, based on a user input specifying "holiday shopping sentiment analysis in New York," the multi-agent simulator platform generates a preliminary question including "How do consumers from Manhattan and Brooklyn respond to holiday promotions?" The multi-agent simulator platform can generate a representation of the preliminary question for display on a GUI. The user can subsequently modify the preliminary question (e.g., via an associated user control on the GUI, such as a text box). For example, the user can modify the question to include and/or tune constraints desired to be incorporated within the simulation. To illustrate, the modified question is "How do consumers from Manhattan and Brooklyn respond to buy-one-get-one-free promotions on Black Friday weekend in the context of online shopping?" As such, preliminary questions enable user-driven refinement of simulation scenarios that incorporate domain expertise and specifications within a particular hypothesis and/or associated simulation session, enabling iterative hypothesis development combining automated question generation with human supervision and refinement.

The instructions 702, the query 802, and/or the input item 804 can specify a set of agent traits (e.g., the input traits 706) associated with the simulation. For example, the instructions 702 can include a set of input traits 706. The input traits 706 can be specified within the query 802. To illustrate, the query 802 can include one or more natural language questions, such as, "What do younger urban millennials think about the background color of this logo when coupled to this slogan? Which color works best to increase demand in this demographic?" Based on this query, the platform can generate an indication of one or more sets of traits associated with agents (e.g., using a large-language model or any suitable type of model, including an artificial neural network). For example, the platform can determine to generate a first agent with a set of traits associated with a male, professional, working in New York City, with an age of 30. As described in relation to FIG. 6 (e.g., with respect to agent characteristics 632 and/or agent state 634), the platform can generate a sets of traits based on demographic, census, and/or map data (e.g., based on a distribution of traits or characteristics within a domain).

The question 704 can be associated with an input item 804 (e.g., of a particular input format). An input item can include varied types of data associated with a query (e.g., the query 802). For example, the input item can include data structures associated with different aspects of a marketing strategy, product design, scenario, or stimuli being tested.

In some implementations, the input item includes visual elements or data structures, such as images of logos, products, packaging designs, advertisements, or other suitable image-related data. For example, the input item can include data structures of suitable formats (e.g., input formats including JPEG, PNG, or SVG).

In some implementations, the input item includes textual content, such as slogans, product descriptions, marketing copy, brand messaging, and/or text associated with images or video (e.g., transcripts of videos or transcriptions of images). Additionally or alternatively, the textual input item can include source code, computer-executable code, pseudocode, and other suitable data. In some implementation, text-related data associated with an input item 804 includes plain text, formatted text, text strings, and/or other suitable data (e.g., input formats including HTML and/or markdown).

In some implementations, the input item includes audio content, such as voice-overs, jingles, sound effects, music, podcast data, and/or other suitable data (e.g., in formats such as MP3 or WAV). In some implementations, the input item includes 3D models (e.g., representing product designs, packaging, architecture, or virtual environments, such as interior decoration or design), such as in OBJ or STL file formats.

In some implementations, the input item can include other suitable information, data structures, or files, such as objects that incorporate abstract information, such as color palette, font specifications, interactive elements (e.g., website files or application prototypes), sensory depictions (e.g., textual representations of tactile, olfactory, or gustatory information), demographic information, and/or contextual data (e.g., information relating to market conditions, competitor products, and/or environmental factors).

The platform can receive a single input item and/or a combination of multiple input items (e.g., of different formats or incorporating different information), enabling comprehensive representation of complex scenarios or hypotheses.

Figures 9A, 9B:
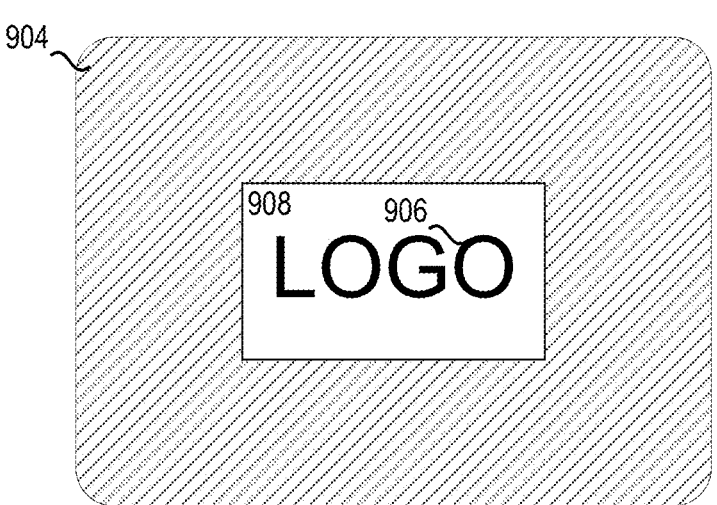
FIG. 9A is a block diagram illustrating an input item, according to some arrangements.
FIG. 9B is a block diagram showing a data schema associated with the input item of FIG. 9A, according to some arrangements.

FIG. 9A is a block diagram illustrating an input item 900, according to some arrangements. For example, the input item 900 includes an image file that includes a background with a set of properties, a foreground 908 with a set of properties, and an image-based representation of text 906. The image file can be in a bitmap, JPEG, SVG, or another suitable format. Elements, components, or aspects of the input item 904 can be associated with particular attributes or properties, such as textures or colors. To illustrate, the background (and/or any other elements associated with the input item 904) can be associated with a color, texture, or gradient. The foreground 908 can include elements such as shapes, icons, or product images; such elements or components can include properties such as size, position, and/or opacity. The text representation 906 can be a logo or a slogan, including properties such as font style, size, and color.

FIG. 9B is a block diagram showing a data schema 920 associated with the input item of FIG. 9A, according to some arrangements. For example, the data schema 920 includes a set of keys 922 and associated values 924 (e.g., in the form of a key-value dataset). The data schema 920 can specify information characterizing features, elements, or components of the input item 900 of FIG. 9A. For example, the data schema 920 includes a key-value dataset, including keys 922 associated with the length of the input item (e.g., the length of an associated image), the width of the input item, a background color, a foreground text, a foreground color, contrast, border style, and/or other associated information. The data schema 920 can include the values 924 associated with the keys 922.

The platform can generate the data schema (e.g., 806, 920) based on the input item (804, 900). For example, the platform can include a multimodal input processor that enables ingesting of multimodal data. The processor can transform and align multimodal data with a universal data schema (e.g., data schema 806, in an XML, JSON, table, relational database, key-value set, or the like), thereby enabling feature engineering and improved simulation capabilities. The platform can receive multimodal input (e.g., the input item 804), such as a scenario, world, agents, question parameters, and so forth, in various forms, including image, video, audio, text, source code, computer executable code, pseudo-code, and the like. The platform can generate a data schema and process the input data using modality-specific logic to populate the data schema. In some implementations, the data schema can include a set of keys for each component of the input item (e.g., if the input item is composed of multiple components, such as different regions of an image).

For example, when receiving video input, the platform can employ automated speech recognition (ASR) and/or computer-vision techniques to transcribe spoken language and extract relevant text from visual elements, such as captions, subtitles, or displayed text. The extracted text can undergo tokenization, where the platform breaks the extracted text into individual words, phrases, or symbols, known as tokens. The tokens can be further processed using natural language processing (NLP) techniques, such as part-of-speech tagging, named entity recognition, and dependency parsing. Finally, the tokens can be vectorized, where each token is presented as a numerical vector in a high-dimensional space, enabling the platform to perform semantic analysis, sentiment analysis, and other machine learning tasks on the video-derived text data. Additionally or alternatively, the platform uses image-to-text conversion techniques to generate descriptions of images, parse descriptions into sets of attributes, and vectorize the attributes. Accordingly, the universal data schema can include attributes or properties that describe any of the items disclosed herein, such as environments, questions, queries, agents, traits, rules, and so forth.

In some implementations, the platform provides the input item to a data conversion model and/or a computer vision model to generate a textual summary of the input item (e.g., or any other suitable data of a suitable format). To illustrate, the platform can provide the input item 900 to a computer-vision model to generate a natural-language textual description of the logo (e.g., including the background, the foreground, and the text). The textual description can include a description of key features associated with the input item, as well as any other suitable descriptive elements (e.g., associated with size). Based on the generated textual description (or otherwise converted data), the platform can generate the data schema in a format that is flexible with respect to input format.

In some implementations, the platform generates a data schema according to the format of the input item. For example, the platform can determine that the input item is of a first format (e.g., an image format) and can determine a set of keys (e.g., "tags") for which to populate associated values based on a schema template database. The schema template database can include a template for a data schema associated with a particular data type or input item format (e.g., a set of keys associated with a particular data format). For example, the platform determines that the input item is an "image" type and can retrieve a set of keys that are associated with and/or are otherwise descriptive of an "image"-type input item, such as a number of pixels, an aspect ratio, a contrast level, a file-format identifier, and/or other suitable image-related keys. By doing so, the disclosed operations can ensure that the generated data schema accurately and comprehensively represents the input item's characteristics, enabling precise and relevant hypothesis generation and testing. The approach enables flexibility in handling various input formats, as the platform can dynamically select appropriate schema templates based on the detected input types.

The data schema can include information relating to visual attributes associated with the input item. For example, visual attributes (e.g., associated with keys of the data schema) include a background color, a background texture, an illustration style, a contrast level, a saturation level, a foreground color, a border style, a shadow effect, a transparency level, an animation effect, a gradient, a pattern, a lighting effect, a resolution parameter, or other suitable visual attributes. In some implementations, a single image/visual-type input item can include various components, each of which includes one or more visual attributes represented within the data schema.

The data schema can include information relating to audio-based attributes associated with the input item. For example, audio attributes (e.g., associated with keys of the data schema) include a sample rate, a bit depth, a channel configuration, a compression ratio, a frequency range, a dynamic range, a loudness level, a tempo setting, a playback speed, an average pitch value, an equalization setting, or other suitable audio attributes. In some implementations, a single audio-based input item can include various components, each of which includes one or more audio attributes represented within the data schema.

In some implementations, the data schema includes information relating to constraints applied to the simulation. For example, a constraint includes limitations or conditions (e.g., derived from user input and/or external data) governing agent behavior, virtual world characteristics (e.g., environmental and/or temporal), and/or input item-related conditions. For example, a constraint includes a parameter specifying a maximum number of agents, an economic condition (e.g., a consumer price index, inflation rate, and/or Gross Domestic Product), a regulatory condition/constraint (e.g., a limitation on a marketing strategy, a tax restriction, a product ban, and/or other suitable regulatory and/or legislative constraint or information), requirements/attributes/constraints associated with cybersecurity vulnerabilities, and/or other suitable constraints (e.g., based on one or more factors associated with external data). For example, the constraint includes an environmental indicator (e.g., associated with a season and/or weather within the simulation session). The constraint can include a restriction associated with agent interactions, such as a parameter specifying that agents with household incomes above $100,000 demonstrate higher engagement with premium product promotions. The constraint can derive and/or be inferred from external data (e.g., an inflation rate constraint can be within a range of previous inflation rates associated with suitable economic data from an external source). In some implementations, the constraint is represented as a key-value pair (e.g., within a data schema associated with a hypothesis). As such, constraints enable dynamic incorporation of real-world market conditions and/or user-determined conditions into agent behavior modeling, world characteristic modeling, and/or other suitable simulation characteristics, thereby enabling contextually relevant predictions reflecting suitable economic and social factors associated with a particular user input (e.g., question).

In some implementations, the sentiment modeling platform generates the data schema based on the input item and/or an associated converted data structure (e.g., a natural-language textual description of the input item). For example, the sentiment modeling platform provides the input item and/or a suitable representation thereof to a schema generation model (e.g., a natural-language model or another suitable artificial-intelligence model) to generate the associated data schema (e.g., in an XML, JSON, table, relational database, key-value set, or the like). By doing so, the disclosed operations can dynamically create comprehensive and adaptable data schemas capturing both explicit and implicit characteristics of the input item, enabling nuanced representations of complex inputs, such as multimodal data, marketing strategies, or product designs.

In some implementations, the sentiment modeling platform can generate input configurations (e.g., data structures that indicate characteristics and/or parameters associated with the simulation), such as using a configuration generation model (e.g., a natural-language model or another suitable artificial model). In some implementations, the configuration generation model can be included in or can include the schema generation model). In some implementations, an input configuration includes a data schema, conditions associated with the virtual world (e.g., environmental and/or temporal conditions), one or more agent traits, and/or other suitable parameters (e.g., as described in relation to FIGS. 5 and 6). The input configuration can specify simulation parameters such as the number of agents to instantiate, durations of simulation sessions, interaction rules between agents, and/or constraints on agent behavior. In some implementations, the input configuration is of a pre-determined (e.g., "universal" format). In some implementations, the input configuration has the same format as a data schema. The input configuration can include metadata relating to simulation context, such as the purpose of the simulation, target demographics, metadata from external computing systems (e.g., hypothesis store, model store, source of at least a portion of the data feed) and/or specific metrics to track or post-processing steps to execute.

In some implementations, the sentiment modeling platform generates a single data schema based on a set of input items (and/or an input item representing multimodal information). For example, the input items can include multiple components of a particular marketing strategy, including an image-based logo, a text-based slogan, and a 3D design (e.g., of an associated product). The sentiment modeling platform can generate a single data schema describing and/or otherwise characterizing the input items. The data schema can include keys associated with the different input item types, such as keys associated with images, text, and 3D designs. Accordingly, the sentiment modeling platform can populate the data schema with values associated with the included keys. By doing so, the sentiment modeling platform enables generation of complex input items (e.g., representing multimodal marketing strategies) within a single, universal data schema, thereby improving the flexibility of world simulation and associated sentiment modeling.

Based on the generated data schema, the sentiment modeling platform can generate one or more hypotheses (708a, 708b-708n) associated with the input item and the query (e.g., the question) 704. A hypothesis can include a scenario, stimulus, and/or set of conditions associated with simulation of agent interactions within the virtual world. To illustrate, a hypothesis can include a natural-language question (e.g., the query 802 of FIG. 8) and/or an associated representation of an input item (e.g., the data schema 806 associated with the input item 804). To illustrate, a hypothesis includes (1) a natural-language question requesting feedback from agents regarding a particular marketing strategy (e.g., a logo) and (2) the data schema 806 representing the particular marketing strategy. The query can include a natural-language question directed at one or more agents, such as "How would you describe the persuasiveness of this marketing strategy?" The associated data schema 806 can include a key-value dataset describing components of the associated marketing strategy.

In some implementations, the sentiment modeling platform generates the natural-language question associated with the hypothesis 708a using the received query 802 of FIG. 8. For example, the received query can include the query, "What do younger urban millennials think about the background color of this logo when coupled to this slogan? Which color works best to increase demand in this demographic?" The platform can generate (e.g., using a large-language model) a natural-language query for a particular hypothesis, such as the natural-language question, "How do you like this logo, with a pink background, coupled with the attached slogan?" Along with this natural-language question, the hypothesis 708a can include a data schema 806 consistent with the question (e.g., where the data schema describes a logo with a pink background and an associated slogan). By doing so, the sentiment modeling platform enables evaluation of reactions to particular, determined scenarios, conditions, or stimuli based on the input question.

The sentiment modeling platform can generate various hypotheses based on the question 704 (e.g., hypotheses 708a, 708b-708n of FIG. 7). For example, the sentiment modeling platform generates various data schema and associated natural-language queries by varying one or more values associated with one or more particular keys of the data schema. To illustrate, the sentiment modeling platform changes the value of a "logo_background_color" key from "pink" to "blue" to generate a second data schema for a second hypothesis. Similarly, the sentiment modeling platform can change the value of a "slogan_text" key from "We have the freshest coffee!" to "We have the smoothest coffee!" to generate a third data schema for a third hypothesis. The sentiment modeling platform can generate a set of hypotheses (e.g., of a pre-determined and/or variable number) based on modifying attributes/values and/or keys associated with one or more data schemas. The platform can adjust the natural-language questions to be asked to the agents according to the changes in the schemas. For example, a second natural-language question (e.g., corresponding to the second hypothesis) for agents of the set of agents can include the question, "What do you think of this logo with a blue background?", while a third natural-language question (e.g., corresponding to the third hypothesis) for agents of the set of agents can include the question, "What do you think of this updated slogan?"

In some implementations, a generated hypothesis can include a data schema representing one or more components or input items that do not exist in one or more other data schemas associated with other hypotheses. For example, the data schema of a fourth hypothesis can include an additional set of keys (and corresponding values) associated with another marketing strategy (e.g., a product design). By doing so, the disclosed operations enable flexible, modular evaluation of complex scenarios.

In some implementations, the platform can generate hypotheses according to traits of the virtual world (e.g., based on the environmental or temporal conditions of the world of a given virtual world). The platform can determine that the virtual world includes an environment that is indicative of a recession (e.g., based on economic indicators, social media trends, and/or similar news) and generate hypotheses that reflect and/or are depend on such factors. To illustrate, the platform can generate a hypothesis that asks agents for reactions to a marketing strategy that highlights the low cost of a particular product (e.g., with a corresponding slogan) due to the recession-related attributes of the virtual world. The hypothesis can include a data schema that includes a slogan key associated with a value including particular tokens indicative of the recession, such as a slogan that emphasizes the low cost of a given product.

Based on the generated hypotheses (e.g., 708a, 708b-708n), the sentiment modeling platform can instantiate associated agents and execute corresponding simulations (e.g., the simulations 710a, 710b-710n) for the generated hypotheses. To illustrate, the sentiment modeling platform can run the simulation of the set of agents (e.g., within the virtual world) for each scenario represented by each generated hypothesis, representing different marketing strategies (e.g., with differing logo characteristics, slogans, and/or product designs). The sentiment modeling platform can submit each hypothesis (e.g., a query and an associated data schema) to each agent of the set of agents to generate an associated output from each agent. The outputs by the agents of the set of agents can be compiled to generate an output set for each hypothesis (e.g., the output sets 712a, 712b-712n).

For example, based on the generated hypothesis 708a (e.g., based on the generated data schema 806) and associated agents 810 of FIG. 8 that are consistent with the set of input traits 706, the sentiment modeling platform can execute the simulation 812 (e.g., according to the processes detailed with respect to FIGS. 5 and 6 and using components described in FIGS. 1-4). The simulation (e.g., one or more of simulations 710a, 710b-710n) can include a process that enables simulation of complex interactions (e.g., between instantiated agents) within a virtual world. A virtual world can include a simulation space based on users' inputted rules, constraints, event identifiers, minimum agent quantities, minimally sufficient agent traits, minimally sufficient trait types, and so forth. For example, the virtual world includes definitions, templates, and/or descriptions of agent interactions, environmental conditions, and/or temporal conditions, as described in relation to FIG. 6 (e.g., the virtual world 610). The virtual world can be associated with a physical configuration (e.g., associated with a physical world and/or software/hardware/real-life environment).

An output set can include responses and/or data generated by agents during the simulation. For example, an output set can include one or more outputs from agents of the set of agents. An output can include textual feedback (e.g., a natural language response from an agent associated with opinions, reactions, or sentiments associated with the hypothetical scenario). The output can include numerical ratings (e.g., quantitative scores or ratings associated with agents for different aspects of marketing strategy or product design). The output can include behavioral data (e.g., including simulated reactions or decisions associated with agents in response to the hypothesis, such as a likelihood to purchase, sharing on social media, and/or recommendations to others). The output can include emotional indicators, such as representations of the agents' emotional responses, (e.g., using categorical labels, such as "excited," "indifferent," "confused," etc.) or numerical values on associated emotional scales. The output can include time-based data (e.g., including a representation of an evolution of the agent's behavior and/or thoughts), and/or associated confidence levels. 960.

The output set (e.g., the output set 814) can include a compilation of outputs associated with particular agents. For example, the output set includes a set of outputs associated with particular agents, including an indicator of the demographics/traits associated with the agents. In some implementations, the output set includes summaries (e.g, numerical and/or qualitative, such as via natural language) across various agents, such as information relating to how agents interacted with each other in response to the hypothesis (e.g., discussions or influence patterns) and/or demographic breakdowns (e.g., an analysis of how different agent subgroups responded to the hypothesis). Output sets can include quantitative and/or qualitative information, such as scores, percentages, predicted values, narratives, images, video, audio, charts, graphs, heatmaps, and so forth. Additionally or alternatively, the output set includes confidence intervals, uncertainty estimates, and sensitivity analyses.

Based on one or more output sets (e.g., 712a, 712b-712n, corresponding to one or more hypotheses 708a, 708b-708n), the sentiment modeling platform can execute a sentiment analysis 714. The sentiment analysis can include aggregation of agent responses (e.g., agent feedback), including a compilation and/or summary of collective feedback from the agents of the set of agents for across the tested hypotheses.

In some implementations, the sentiment analysis 714 can include extraction of sentiment tokens associated with the output sets. A sentiment token can include a word, phrases, sentence, or other natural language unit that can capture a sentiment or opinion expressed by agents in responses (e.g., within the simulation and/or virtual world).

Additionally or alternatively, the sentiment token can include a numerical value representing an intensity or polarity of a particular sentiment (e.g., on a scale from $-1$ to $1$, where $-1$ is extremely negative and $+1$ is extremely positive). In some implementations, the sentiment token includes an emotional label or category summarizing the expressed sentiment (e.g., "excited," "disappointed," "satisfied").

A sentiment token can be associated with a particular agent (e.g., associated with a particular output/responses of the output set). Additionally or alternatively, a sentiment token is associated with a set of agents (e.g., or a subset thereof). For example, the sentiment token includes a key attribute or feature of a hypothesis that agents frequently mention and/or reacted to in responses, and/or a particular response or word (e.g., an adjective) mentioned by a significant number (e.g., above a threshold number) of agents of the set of agents with respect to a particular hypothesis. In some implementations, the sentiment token includes a demographic identifier associated with a sentiment and an associated subset of agents. The sentiment token can include a vector representation of a sentiment (e.g., capturing one or more dimensions of opinions expressed by agents; for example, a first axis in the vector represents a first sentiment, such as "satisfaction," and a second axis represents a second sentiment, such as "excitement"). In some implementations, the sentiment token includes an indication of a timestamp and/or a representation of a progression of sentiment over time (e.g., using a sequence marker).

In some implementations, the sentiment modeling platform determines and/or extracts a sentiment token from each output set (e.g., generated in response to each hypothesis 708a). Additionally or alternatively, the sentiment modeling platform generates one or more sentiment tokens representing multiple hypotheses.

The sentiment modeling platform can generate a sentiment summary (e.g., based on and/or comprising first and second sentiment tokens). For example, the sentiment modeling platform can tokenize output sets associated with the hypotheses and provide the associated tokens to a sentiment analysis model. The sentiment analysis model can generate a sentiment summary (e.g., a natural-language summary) associated with one or more output sets associated with the hypotheses. The sentiment summary can include representations of the one or more sentiment tokens, as described above.

Figure 10:
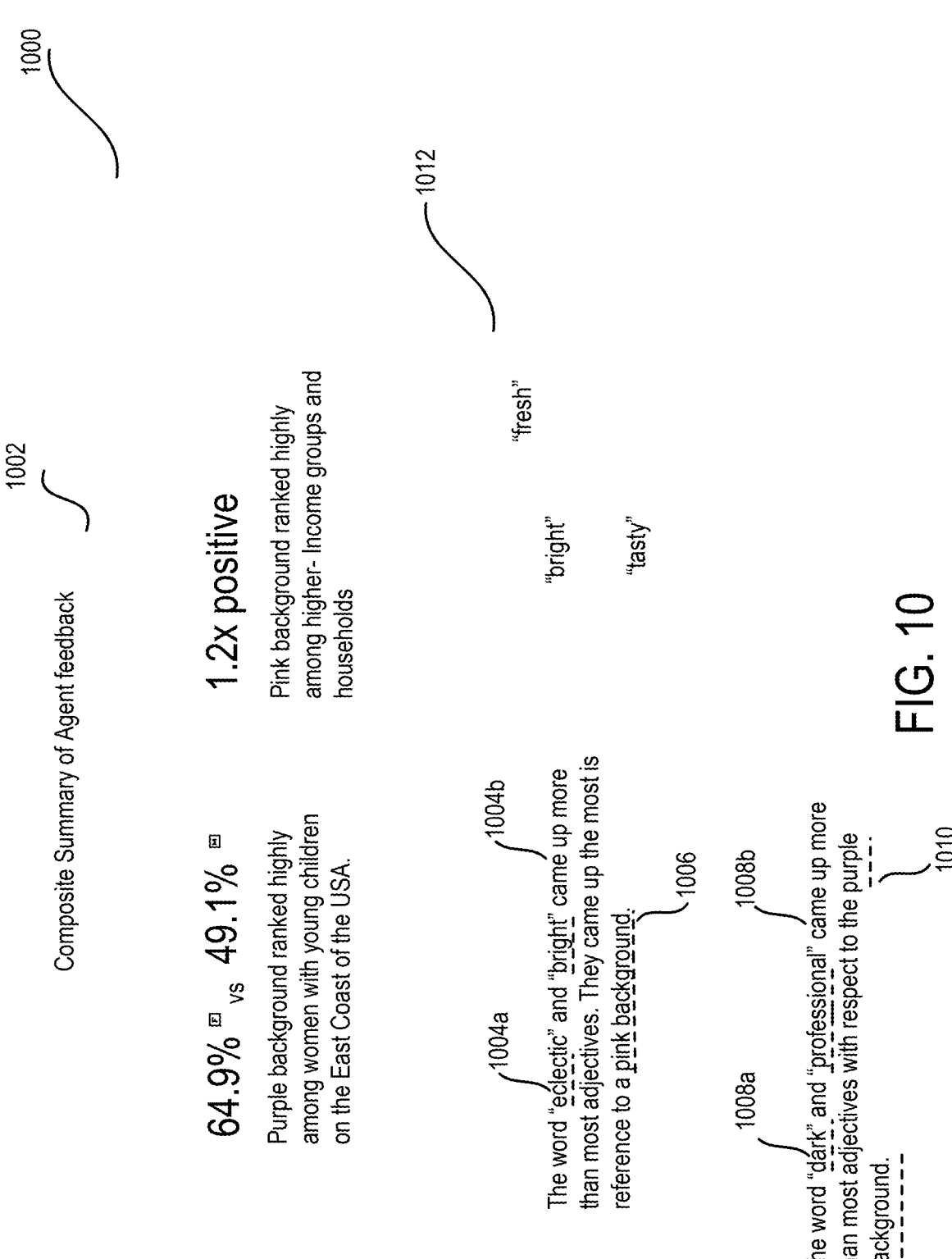
FIG. 10 is an example graphical user interface (GUI) illustrating a sentiment analysis displayed on a mobile device, according to some arrangements.

FIG. 10 is an example graphical user interface (GUI) 1000 illustrating a sentiment analysis (e.g., a sentiment summary and/or associated sentiment tokens) displayed on a mobile device, according to some arrangements. For example, the GUI 1000 can include a sentiment summary that includes a visualization of sentiment analysis results (e.g., graphical representations of sentiment trends, comparative charts showing sentiment across different hypotheses, or heatmaps indicating sentiment intensity for various aspects of a given marketing strategy). For example, the sentiment modeling platform generates a composite summary of agent feedback 1002 (e.g., indicating whether particular attributes of the input items, such as the color of the background, are well-received with particular demographic groups). In some implementations, the sentiment modeling platform generates the sentiment summary including one or more sentiment tokens associated with the different hypotheses (e.g., tokens 1004a or 1004b associated with the pink background 1006; tokens 1008a or 1008b associated with the purple background 1010).

In some implementations, the sentiment modeling platform can implement a feedback loop mechanism whereby results of the sentiment analysis (e.g., sentiment tokens) are used to generate new hypotheses and/or refine existing hypotheses. To illustrate, a particular attribute of a hypothesis that receives consistently positive sentiment (e.g., is associated with positive sentiment tokens) can be used to generate a new hypothesis (e.g., a new data schema) including variations of this attribute. Additionally or alternatively, the sentiment modeling platform can determine to maintain the attribute associated with the positive sentiment tokens fixed and vary other attributes, in response to the sentiment analysis.

In some implementations, the sentiment modeling platform generates confidence scores for sentiment tokens and summaries (e.g., indicating the reliability of the sentiment analysis) based on factors associated with the output sets, such as consistency of agent responses, the size of the agent sample, and/or the specificity of the feedback. The platform can implement a comparative analysis (e.g., comparing summaries from different hypotheses). For example, the platform can generate differential sentiment tokens, using the sentiment analysis model, that represent how sentiment varies between hypotheses.

FIG. 11 is an example flowchart showing operations of the multi-agent simulator platform (e.g., the sentiment modeling platform), according to some arrangements. One or more components described above with respect to FIGS. 1-6 (e.g., components of the computer system 200) can perform various operations or processes described herein.

At 1110, the sentiment modeling platform can generate a virtual world including a set of agents. For example, the sentiment modeling platform (e.g., using instructions 204 or 210, processor 202, and/or main memory 208 of FIG. 2, and/or other suitable components described above with respect to FIGS. 1-6) generates a virtual world comprising a set of agents, a first agent in the set of agents having one or more agent traits. In some implementations, agents can include machine-learning models associated with at least one memory, one or more processors, and one or more agent interfaces (e.g., software interfaces such as GUIs and/or hardware interfaces) configured to execute at least one or more actions (e.g., transmission of data to other agents and/or other devices and/or operation of components of a computing system). As an illustrative example, the sentiment modeling platform generates a virtual world that includes a set of agents, where each agent has specific traits (e.g., associated with demographic information, preferences, and behavioral characteristics). By doing so, the platform enables a diverse and representative population of simulated entities that can interact within the virtual environment, enabling realistic modeling of complex social dynamics and consumer behaviors.

At 1120, the sentiment modeling platform can receive instructions (e.g., using the input/output device 222 or the network interface device 214 of FIG. 2, and/or other suitable components described above with respect to FIGS. 1-6) that include a question and a set of input traits. For example, the sentiment modeling platform receives, via a graphical user interface (GUI) of a computing device, instructions including (1) a question and (2) a set of input traits. The question can include a first query and can be associated with a first input item. The first input item can include a data structure of a first input format. As an illustrative example, the sentiment modeling platform receives instructions via a GUI relating to a question regarding consumer reactions to a new marketing campaign, along with input traits that specify demographic information for a target consumer base. By doing so, the platform enables users to configure simulations with specific queries and agent characteristics, thereby facilitating the generation of tailored hypotheses for sentiment analysis.

At 1130, the sentiment modeling platform can generate a first hypothesis associated with a first data schema. For example, using the first input format and the first input item, the sentiment modeling platform generates a first hypothesis comprising a first data schema. The first data schema can include (1) a set of keys and (2) a set of values. Each value of the set of values can be associated with a corresponding key of the set of keys. As an illustrative example, the sentiment modeling platform generates a first data schema that includes keys that represent attributes of a marketing strategy, such as logo color, slogan text, or product designs, with corresponding values that specify particular characteristics for each attribute. By doing so, the sentiment modeling platform enables the creation of structured, modifiable hypotheses that can be efficiently processed and analyzed by the set of agents within the virtual world.

In some implementations, the sentiment modeling platform generates a data schema including values and keys in order to generate the first hypothesis. For example, the sentiment modeling platform retrieves, from a schema template database, a schema template associated with the first input format. The sentiment modeling platform can determine, using the schema template, the set of keys. A particular key of the set of keys can indicate a particular property of data structures of the first input format. The sentiment modeling platform can provide the set of keys and the first input item to a schema generation model to generate the set of values corresponding to the set of keys. The sentiment modeling platform can generate the first data schema including the set of values and the set of keys. As an illustrative example, the sentiment modeling platform retrieves a schema template for image data when the platform determines that the first input format is an image file. The schema template can include keys such as image width, image height, background color, and foreground elements. The sentiment modeling platform can use the schema generation model to analyze the input item and populate values for the keys (e.g., with particular numbers for widths or heights in units of pixels and/or particular colors). By doing so, the sentiment modeling platform enables the creation of standardized, structured representations of diverse input formats, enabling consistent processing and analysis across different types of data within the virtual world simulations.

In some implementations, the sentiment modeling platform uses a data conversion model to convert the input item to another format, enabling generation of the data schema. For example, the sentiment modeling platform determines, based on the first query, a second input format. The sentiment modeling platform can provide the first input item to a data conversion model to generate an updated first input item. The updated first input item can be of the second input format. The sentiment modeling platform can generate the first hypothesis comprising the first data schema. The set of keys of the first data schema can be associated with the second input format. As an illustrative example, the sentiment modeling platform determines that the first query can be processed using textual analysis, while the first input item is an image. The platform can use a data conversion model (e.g., an image-to-text model) to generate a textual description of the image. The platform can convert the first input item to a text-based format and can generate the first hypothesis with a data schema that is consistent with a text-based format (e.g., including keys associated with a text file). By doing so, the sentiment modeling platform enables processing of diverse input formats within a unified framework, enabling consistent analysis across different types of data and queries in the virtual world simulations.

At 1140, the sentiment modeling platform can instantiate the set of agents using the set of input traits. As an illustrative example, the sentiment modeling platform creates instances of agents with specific characteristics, including age, income, or education level (or any other suitable characteristics), based on input traits provided in the instructions. By doing so, the sentiment modeling platform enables the creation of a diverse and representative set of agents tailored to the particular instructions or queries (e.g., associated with a target audience).

At 1150, the sentiment modeling platform can execute a first simulation session to generate a first output set. For example, the sentiment modeling platform executes a first simulation session by causing the set of agents to generate, using the first hypothesis and the first query, a first output set. As an illustrative example, the sentiment modeling platform executes a simulation session where the set of agents interacts with the first hypothesis (e.g., a marketing strategy represented by the data schema) and responds to the first query with opinions or reactions. The agents can generate outputs based on individual traits and the specifics of the hypothesis—the output can included textual feedback, numerical ratings, or simulated behaviors. By doing so, the sentiment modeling platform can collect diverse and realistic responses from the simulated population, providing valuable, trait-specific insights into potential real-world reactions not the proposed scenario (e.g., marketing strategy).

At 1160, the sentiment modeling platform can generate a second hypothesis associated with a second data schema. As an illustrative example, the sentiment modeling platform generates a second hypothesis by modifying a value associated with a key of the first data schema. For example, the sentiment modeling platform changes a value associated with a background color key of the data schema from "pink" to "purple" to generate the second data schema. By doing so, the sentiment modeling platform enables efficient testing of multiple variations of a marketing strategy without the need for creating separate input files, thereby avoiding expending significant computational resources for each iteration.

In some embodiments, the sentiment modeling platform generates the second hypothesis based on the first sentiment token. For example, in response to generating the first sentiment token associated with the first output set, the sentiment modeling platform determines the first key of the set of keys. The sentiment modeling platform can determine the first value, of the set of values, that is associated with the first key. The sentiment modeling platform can modify, based on the first sentiment token, the first value to generate a second value. The sentiment modeling platform can generate the second data schema including the second value associated with the first key. As an illustrative example, the sentiment modeling platform determines that the first sentiment token indicates a positive response to the pink background color of a particular logo. In response to the determination, the sentiment modeling platform can modify the background color key value from pink to a similar shade, such as "light pink" or "rose" to generate the second data schema. By doing so, the sentiment modeling platform enables iterative refinement of hypotheses based on agent feedback, enabling targeted and effective simulations of marketing strategies or other scenarios within the virtual world.

In some implementations, the sentiment modeling platform generates the second hypothesis using world characteristics. For example, the sentiment modeling platform accesses an additional data source to generate one or more world characteristics comprising one or more of: (1) an environmental condition or (2) a temporal condition. The sentiment modeling platform can modify, using the environmental condition and/or the temporal condition, the first value associated with the first key of the first data schema to generate the second data schema. As an illustrative example, the sentiment modeling platform accesses weather data to determine a season of the virtual world and modify the background color from "pink" to "snow white" to generate the second data schema. By doing so, the sentiment modeling platform enables generation of context-aware hypotheses that reflect real-world conditions (e.g., within the simulation), thereby improving the flexibility and applicability of the simulations within the virtual world.

In some implementations, the sentiment modeling platform generates the second hypothesis by converting the first input item to another input item of another format. For example, the sentiment modeling platform determines a second input format. The sentiment modeling platform can provide the first input item to a data conversion model to generate a second input item of the second input format. Using the second input format and the second input item, the sentiment modeling platform can generate the second hypothesis comprising the second data schema. The second data schema can include (1) a second set of keys and (2) a second set of values. Each value of the second set of values can be associated with a corresponding key of the second set of keys. As an illustrative example, the sentiment modeling platform converts an image input item to an audio format, transforming visual elements such as colors and shapes into corresponding audio characteristics such as pitch and tempo. The platform can generate a second hypothesis with a data schema that includes keys relevant to the audio analysis, including "frequency range," "volume level," or "audio duration." By doing so, the sentiment modeling platform enables exploration of cross-modal effects in marketing strategies, enabling evaluation of different sensory representations of a concept and how such representations can influence agents' responses within the virtual world.

In some implementations, the sentiment modeling platform generates the second hypothesis by varying a visual attribute of the first data schema. For example, the sentiment modeling platform determines that the first input format corresponds to a visual format. The sentiment modeling platform can determine a first visual attribute comprising at least one of: a background color, a background texture, an illustration style, a contrast level, a saturation level, foreground color, a border style, a shadow effect, a transparency level, an animation effect, a gradient, a pattern, a lighting effect, or a resolution parameter. The sentiment modeling platform can determine the first key associated with the first visual attribute. The sentiment modeling platform can determine the first value associated with the first visual attribute. The sentiment modeling platform can generate a second value associated with the first key. The second value can be different from the first value. The sentiment modeling platform can generate the second hypothesis including the second value associated with the first key. As an illustrative example, the sentiment modeling platform determines that the first input format is an image and modifies a "contrast level" key from "low" to "high" to generate the second hypothesis. By doing so, the sentiment modeling platform enables evaluation of how visual attribute changes can impact agent responses, enabling nuanced testing of marketing strategies within the virtual world simulations.

In some implementations, the sentiment modeling platform generates the second hypothesis by varying an audio attribute of the first data schema. For example, the sentiment modeling platform determines that the first input format corresponds to an audio format. The sentiment modeling platform can determine a first audio attribute comprising at least one of: a sample rate, a bit depth, a channel configuration, a compression ratio, a frequency range, a dynamic range, a loudness level, a tempo setting, a playback speed, an average pitch value, or an equalization setting. The sentiment modeling platform can determine the first key associated with the first audio attribute. The sentiment modeling platform can determine the first value associated with the first audio attribute. The sentiment modeling platform can generate a second value associated with the first key. The second value can be different from the first value. The sentiment modeling platform can generate the second hypothesis including the second value associated with the first key. As an illustrative example, the sentiment modeling platform determines that the first input format is an audio file and modifies a "tempo setting" key value from "slow" to "fast" to generate the second hypothesis. By doing so, the sentiment modeling platform enables evaluation of how audio attributes impact agent responses, enabling comprehensive testing of marketing strategies that incorporate sound elements within the virtual world simulations.

At 1170, the sentiment modeling platform can execute a second simulation session to generate a second output set. For example, the sentiment modeling platform executes a second simulation session by causing the set of agents to generate, using the second hypothesis and the first query, a second output set. As an illustrative example, the sentiment modeling platform executes a second simulation session where the set of agents can interact with the second hypothesis (e.g., a modified marketing strategy represented by the updated data schema). The agents can respond to the first query with opinions or reactions and generate outputs based on their individual traits and the specifics of the modified hypotheses. The output can include textual feedback, numerical ratings, simulated behavior, or other suitable information, reflecting changes made in the second data schema. By doing so, the sentiment modeling platform enables comparison of agent responses across different iterations of a hypothesis, enabling evaluation of how specific modifications to marketing strategies or scenarios might impact simulated population reactions within the virtual world.

In some implementations, the sentiment modeling platform executes the second simulation session by causing the set of agents to generate a second output set based on a second query. For example, the sentiment modeling platform generates, based on the first output set and the second hypothesis, a second query. The sentiment modeling platform can execute the second simulation session by causing the set of agents to generate, using the second hypothesis and the second query, the second output set. As an illustrative example, the sentiment modeling platform generates a second query based on insights gained from the first output set and the modifications made in the second hypothesis. For example, the platform determines that the first output set reveals a particular aspect of interest (e.g., based on the associated first sentiment token) and can generate the second query to explore the aspect further. The sentiment modeling platform can execute the second simulation session using the new query along with the second hypothesis, enabling agents to generate a second output set in response to the refined focus of the query. By doing so, the sentiment modeling platform enables a targeted and iterative approach to exploring complex scenarios, thereby enabling deeper insights into how specific changes in marketing strategies or other simulated conditions impact agent responses in different contexts.

At 1180, the sentiment modeling platform can execute a sentiment analysis. For example, the sentiment modeling platform provides a first tokenized representation the first output set and a second tokenized representation of the second output set to a sentiment analysis model to generate a sentiment summary associated with the first hypothesis and the second hypothesis. As an illustrative example, the sentiment modeling platform provides tokenized representations of the first and second output sets to a sentiment analysis model, which generates a comprehensive sentiment summary that compares agent responses to the first and second hypotheses. The sentiment summary can include key sentiment tokens, trends, and changes in sentiment across the hypotheses. By doing so, the sentiment modeling platform enables a holistic analysis of how modifications to hypotheses impact agent sentiment, enabling a nuanced understanding of the effectiveness of different marketing strategies or scenarios within the virtual world.

In some implementations, the sentiment modeling platform generates a sentiment summary by performing a sentiment analysis on the first output set. For example, the sentiment modeling platform performs sentiment analysis on the first output set. The sentiment modeling platform can tokenize the first output set into a set of items. The sentiment modeling platform can apply a sentiment analysis model to generate the first sentiment token based on the set of items. The sentiment modeling platform can generate a sentiment summary based on the first sentiment token. The sentiment modeling platform can provide the sentiment summary to an experimenter. As an illustrative example, the sentiment modeling platform tokenizes the first output set into individual words or phrases and applies a sentiment analysis model to classify the sentiment of each token. The sentiment modeling platform can generate a summary that captures the overall sentiment expressed by the agents in response to the first hypothesis. The sentiment modeling platform can provide the summary to the experimenter (e.g., a user of the platform) to offer insights into how agents perceive and react to the first hypothesis. By doing so, the sentiment modeling platform enables a comprehensive understanding of agent responses to specific hypotheses, facilitating informed decision-making in refining marketing strategies or other simulated conditions within the virtual world.

At 1190, the sentiment modeling platform display a representation of the sentiment analysis at the GUI. As an illustrative example, the sentiment modeling platform displays a virtual representation of the sentiment analysis results on the GUI, including charts, graphs, or color-coded indicators that summarize the sentiment trends across different hypotheses and agent groups. By doing so, the sentiment modeling platform enables experimenters to compare the outcomes of various simulated scenarios, thereby facilitating efficient analysis and decision making in refining marketing strategies or other simulated conditions within the virtual world.

In some implementations, the sentiment modeling platform generates a representation of tokens based on the sentiment analysis model (e.g., for display on the GUI). For example, the sentiment modeling platform tokenizes the first output set into a first set of items. The sentiment modeling platform can tokenize the second output set into a second set of items. The sentiment modeling platform can provide the first set of items and the second set of items to a sentiment analysis model to generate a sentiment summary associated with the first output set and the second output set. The sentiment modeling platform can generate the representation of the first and second sentiment tokens. The representation can include the sentiment summary. As an illustrative example, the sentiment modeling platform can tokenize both the first and second output sets into individual words or phrases, provide the tokenized sets to a sentiment analysis model, and generate a sentiment summary that compares, summarizes, or evaluates the agent responses to the first and second hypotheses. By doing so, the sentiment modeling platform enables visualization and interpretation of complex sentiment data from multiple hypotheses simultaneously, thereby facilitating comparisons and analysis of different marketing strategies or simulated conditions within the virtual world.

In some implementations, the sentiment modeling platform executes different simulation sessions for many hypotheses in a question chain. For example, the sentiment modeling platform can use the first query, the first input item, and additional data from an additional data source to generate a set of hypotheses to include in a question chain comprising the question. Each hypothesis of the set of hypotheses can be associated with a corresponding input item of a set of input items. The sentiment modeling platform can execute a particular simulation session for each hypothesis in the set of hypotheses. As an illustrative example, the sentiment modeling platform generates a set of hypotheses based on the first query, the first input item, and additional data, such as weather information. A hypothesis in the set can represent a different variation of a marketing strategy and/or multimodal inputs for which agent reactions are sought. The platform can execute separate simulation sessions for each hypothesis in the question chain, enabling a comprehensive analysis of how different variations of the marketing strategy might be received. By doing so, the sentiment modeling platform enables evaluation of multiple related scenarios within a single simulation framework, providing a holistic understanding of different aspects of marketing strategies and their effects on agent responses within the virtual world.

FIG. 12 is an example flowchart showing operations 1200 of the multi-agent simulator platform (e.g., the sentiment modeling platform) using multimodal input processing and attribute extraction, according to some arrangements. One or more components described above with respect to FIGS. 1-6 (e.g., components of the computer system 200) can perform various operations or processes described herein. The multi-agent simulator platform can perform operations, steps, or processes associated with FIG. 11, 12, or 13 in any suitable order, arrangement, or combination.

At 1210, the multi-agent simulator platform (e.g., the sentiment modeling platform) can receive an input dataset of a first format. In an example, the multi-agent simulator platform receives, from a computer device, an input dataset of a first format. The multi-agent simulator platform receives a textual, natural-language data structure (e.g., unstructured text) which can include a description of a simulation to run, a list of entities to simulate, and a list of scenarios and/or items to simulate. In some implementations, the input dataset includes and/or is associated with (e.g., via a hyperlink) to an input item, such as an image, video, or audio file. By doing so, the multi-agent simulator platform accepts various formats of input structures to improve the flexibility of world simulation tasks.

At 1220, the multi-agent simulator platform can provide the input dataset to a hypothesis generation model to generate an input configuration. For example, the multi-agent simulator platform provides the input dataset to a configuration generation model to generate an input configuration comprising two or more of: (1) one or more conditions associated with a virtual world, (2) one or more input traits, or (3) an indication of one or more input items. As an illustrative example, the multi-agent simulator platform provides the input dataset to a large-language model to generate a configuration file (e.g., of a pre-determined and/or standardized format) specified a variety of simulation-related parameters, including which agents to simulate, the nature (e.g., traits) of such agents, and/or associated environmental conditions and/or input files (e.g., images or other scenarios) to which the agents are to react. By doing so, the disclosed operations enable automated configuration of complex simulation parameters for raw input data, improving the flexibility and deployment of multi-agent simulations across diverse scenarios and user input styles.

At 1230, the multi-agent simulator platform can receive a query indicating an attribute associated with an input item of the input configuration. For example, the multi-agent simulator platform receives, via a graphical user interface (GUI) associated with the computer device, a first query associated with a first input item of the one or more input items. As an illustrative example, the multi-agent simulator platform receives a query asking about consumer reactions to a new marketing campaign logo with specific color attributes (e.g., specifying demographic information for target consumers within the simulation). By doing so, the disclosed operations enable users to configure simulations with specific queries and agent characteristics, facilitating the generation of tailored hypotheses for analysis of sentiment/impression.

At 1240, the multi-agent simulator platform can determine that a first query indicates a first attribute of the first input item. As an illustrative example, the multi-agent simulator platform analyzes (e.g., parses, extracts items from) the first query to identify specific attributes or properties referenced within the query, such as visual attributes (e.g., background color, foreground color, contrast level, border style, etc.). By doing so, the disclosed operations enable targeted attribute extraction and modification to generate a data schema that enables hypothesis generation for a user-guided scenario, based on the user's query.

At 1250, the multi-agent simulator platform can determine a first value associated with the first attribute of the first input item. For example, in response to determining that the first query indicates the first attribute of the first input item, the multi-agent simulator platform determines a first value associated with the first attribute of the first input item. As an illustrative example, the multi-agent simulator platform determines that a query asking "What would younger urban millennials think about a pink background color for this logo?" indicates a "background color" attribute of the input item. In response to the determination, the multi-agent simulator platform can determine a background color value (e.g., "pink") that enables testing a hypothesis according to the user's query. By doing so, the multi-agent simulator platform enables identification and extraction of specific attributes from multimodal input items to facilitate targeted hypothesis generation and testing of variations of attribute values within the virtual world.

In some implementations, the multi-agent simulator platform determines the first value based on external data. For example, in response to determining that the first query indicates the first attribute of the first input item, the multi-agent simulator platform retrieves external data, including one or more of a company report, a news article, a social media feed, or a document. The multi-agent simulator platform can provide the external data to an artificial intelligence model to generate the first value associated with the first attribute. As an illustrative example, the multi-agent simulator platform retrieves external data, such as current market trends or colors that are being talked about on social media platforms. The platform can provide the external data to an artificial intelligence model (e.g., a large-language model) to determine which colors to test with respect to a logo's background color, to illustrate. For example, the multi-agent simulator platform selects a value of "blue" for the background color based on seasonal preferences or industry standards reflected in the external data. By doing so, the disclosed operations enable context-aware hypothesis generation, reflecting real-world conditions and market dynamics.

At 1260, the multi-agent simulator platform can provide the first value and the first input item to a schema generation model to generate a first data schema. For example, the multi-agent simulator platform provides the first value and the first input item to a schema generation model to generate a first data schema associated with a first hypothesis. The first data schema includes the first value associated with the first attribute. As an illustrative example, the multi-agent simulator platform provides a logo input item with a background color that is pink to a schema generation model (e.g., as described with respect to FIGS. 7-11) to generate a data schema that includes keys such as "background color," "foreground text," and "contrast" with their corresponding values for use in hypothesis testing within the virtual world. By doing so, the disclosed operations enable structured representation of multimodal input items in a format that is processable by agents and easily modified (e.g., to create variants of the hypothesis, as described in relation to FIGS. 7-11 and/or below) without requiring regeneration of input files.

At 1270, the multi-agent simulator platform can generate a virtual world with the set of agents. For example, the multi-agent simulator platform generates, according to the input configuration and the first data schema, the virtual world comprising a set of agents. The virtual world can exhibit the one or more conditions. At least one agent of the set of agents can have the one or more input traits. As an illustrative example, the multi-agent simulator platform generates a virtual world that simulates the morning commute in cities across the New York region and includes characteristics such as demographics, transportation modes, seasonality (e.g., a date on a calendar), and/or coffee shop locations (e.g., where agents representing coffee shop customers are associated with particular demographic characteristics associated with the input traits). By doing so, the disclosed operations enable realistic modeling of complex social dynamics and consumer behaviors within a representative population of simulated entities according to the user's query.

At 1280, the multi-agent simulator platform can execute a first simulation session to generate a first output set. For example, the multi-agent simulator platform executes a first simulation session by causing the set of agents to generate, using the first hypothesis, a first output set. As an illustrative example, the multi-agent simulator platform executes a simulation session where the agents interact with the first hypothesis (e.g., a logo with the determined first value associated with the first attribute, such as a pink background color). The multi-agent simulator platform can provide the data schema to each agent of the set of agents. The agents within the simulation can cause generation of outputs (e.g., based on the individual traits associated with the agents and the specifics of the hypothesis); the output can include textual feedback, numerical ratings, simulated behaviors, and/or other suitable behavior. By doing so, the disclosed operations enable the collection of diverse and realistic responses from the simulated population, providing insight into potential real-world reactions to the proposed scenario within the virtual world according to the user's concerns or queries (e.g., as expressed within the received user query).

At 1290, the multi-agent simulator platform can generate, for display on a GUI, a representation of the first output set. For example, the multi-agent simulator platform generates, for display on the GUI of the computer device, a representation of the first output set. As an illustrative example, the multi-agent simulator platform generates a representation that includes a composite summary of agent feedback (e.g., with numerical values, such as sentiment/impression scores and demographic breakdowns showing how agent subgroups respond to the hypothesis). In some implementations, the multi-agent simulator platform transmits a representation of the first output set to another computer device and/or system component (e.g., in the form of a text file, computer code, multi-modal format, and/or another suitable format). By doing so, the disclosed operations enable experimenters to visualize and interpret complex impression data associated with agents, based on hypotheses or scenarios relevant to the user's query (e.g., using attributes or values highlighted within the user's query).

In some implementations, the multi-agent simulator platform generates a second hypothesis for testing within the virtual world based on a different value. For example, in response to determining that the first query indicates the first attribute of the first input item, the multi-agent simulator platform determines a second value associated with the first attribute of the first input item. The second value can be different from the first value. The multi-agent simulator platform can provide the second value and the first input item to the schema generation model to generate a second data schema associated with a second hypothesis. The second data schema can include the second value associated with the first attribute. The multi-agent simulator platform can execute a second simulation session by causing the set of agents to generate, using the second hypothesis, a second output set. As an illustrative example, the multi-agent simulator platform determines a second value (e.g., "blue") for the background color attribute where the first value was different (e.g., "pink"). The multi-agent simulator platform can provide the second value, along with the input item (e.g., the logo) and/or the first data schema to a schema generation model to generate a second data schema that enables testing of how agents respond to the modified logo design within the same simulation framework. By doing so, the multi-agent simulator platform enables efficient testing of multiple variations of a marketing strategy without creating separate, full-sized input files and avoiding the need to expend significant computational resources for each iteration, while facilitating rapid comparison of agent responses across different scenarios.

In some implementations, the multi-agent simulator platform generates a second hypothesis based on a different attribute of the input item. For example, the multi-agent simulator platform determines that the first query indicates a second attribute of the first input item. The second attribute can be different from the first attribute. In response to determining that the first query indicates the second attribute of the first input item, the multi-agent simulator platform can determine a second value associated with the second attribute. The multi-agent simulator platform can provide the second value associated with the second attribute and the first input item to the schema generation model to generate a second data schema associated with a second hypothesis. The second data schema can include the second value associated with the second attribute. The multi-agent simulator platform can execute a second simulation session by causing the set of agents to generate, using the second hypothesis, a second output set. As an illustrative example, the multi-agent simulator platform determines that the first query indicates a "font-style" attribute for the logo (e.g., in addition to the "background color"-related query). The platform can determine a second value (e.g., "serif") for the font style attribute and can provide the second value, as well as the input item (e.g., the logo) and/or the associated first data schema to the schema generation model to generate a second data schema with the specified font style. By doing so, the multi-agent simulator platform enables evaluation of how multiple attribute changes can impact agent responses simultaneously (e.g., in a non-linear and/or complex manner), thereby facilitating the comprehensive testing of scenarios (e.g., marketing strategies) that incorporate various elements within the virtual world.

In some implementations, the multi-agent simulator platform generates a second hypothesis based on an impression caused by the first hypothesis. For example, the multi-agent simulator platform provides the first output set to an impression analysis model to generate an impression summary associated with the first hypothesis. In response to generating the impression summary associated with the first hypothesis, the multi-agent simulator platform determines a second attribute associated with the first input item. The multi-agent simulator platform can determine a second value associated with the second attribute. The multi-agent simulator platform can generate a second data schema associated with a second hypothesis. The second data schema can include the second value associated with the second attribute. The multi-agent simulator platform can execute a second simulation session by causing the set of agents to generate, using the second hypothesis, a second output set. As an illustrative example, the multi-agent simulator platform provides the first output set to an impression analysis model (e.g., as disclosed above) that generates an impression summary. The impression summary can indicate that agents responded positively to particular attributes of the logo (e.g., the background color) but negatively to other attributes (e.g., contrast levels). Based on the impression summary, the platform can determine a second attribute (e.g., "contrast") and generate the second data schema with a modified value for the second attribute (e.g., a lower contrast level) to enable further testing of agent reactions to different elements within the virtual world.

In some implementations, the multi-agent simulator platform generates the second hypothesis based on a user query associated with one or more input items. For example, in response to generating, for display on the GUI, the representation of the first output set, the multi-agent simulator platform receives a user query associated with the first input item. In response to receiving the user query, the multi-agent simulator platform can generate, for display on the GUI, results based on a search term associated with the user query. In response to generating the results, the multi-agent simulator platform can generate a second hypothesis based on the results. The multi-agent simulator platform can execute a second simulation session by causing the set of agents to generate, using the second hypothesis, a second output set. As an illustrative example, the multi-agent simulator platform receives a user query asking "What if we change the logo to include a green border?" after displaying the first output set (e.g., an associated impression summary). The platform can generate search results showing the available border style options and color variations and can create a second hypothesis with a data schema that includes a "border style" key with the value "solid" and a "border color" key with the value "green" in order to test the modified logo design. By doing so, the disclosed operations enable user-driven, iterative hypothesis generation that responds to experimenters' interests and/or insights.

In some implementations, the multi-agent simulator platform generates the second hypothesis based on the user query and a user response accordingly. For example, in response to generating, for display on the GUI, the results based on the search term, the multi-agent simulator platform (1) receives a user input, via the GUI, comprising a second value associated with a second attribute, and (2) generates the second hypothesis including a second data schema. The second data schema can include the second value associated with the second attribute. As an illustrative example, the multi-agent simulator platform receives a user input via the GUI (e.g., via a user control, such as a textbox and/or associated chat bubble) that includes a search query relating to other possible attributes to add to the logo (e.g., a watermark). The multi-agent simulator platform can display different watermark styles (e.g., on a webpage or a mobile application); based on the different options, the user can select an option for a watermark (e.g., or any other suitable attribute and value associated with the attribute) to test within the simulation. Based on the user input, the multi-agent simulator platform can generate the second data schema (such that the data schema includes the selected option). By doing so, the multi-agent simulator platform enables direct user control over generated hypotheses, thereby facilitating refinement of different scenarios (e.g., marketing strategies) to be tested based on user input, preferences, and/or real-time insights from simulation results within the virtual world. For example, the disclosed operations enable an experimenter to react to generated results based on a first simulation session and tweak or modify hypotheses to be tested in subsequent simulation sessions.

FIG. 13 is an example flowchart showing of the multi-agent simulator platform using dynamic model-parameter and constraint generation, according to some arrangements. One or more components described above with respect to FIGS. 1-6 (e.g., components of the computer system 200) can perform various operations or processes described herein. The multi-agent simulator platform can perform operations, steps, or processes associated with FIG. 11, 12, or 13 in any suitable order, arrangement, or combination.

At 1310, the multi-agent simulator platform can receive instructions including a user input. For example, the multi-agent simulator platform receives, via a graphical user interface (GUI) of a computing device, instructions comprising a user input including a seed phrase. As an illustrative example, the multi-agent simulator platform receives a user input that includes a set of words, phrases, or other tokens (e.g., a seed token) that describes aspects of a desired simulation. The user input can include a sentence or search query, such as "retail sentiment analysis for holiday shopping in New York City." The seed token can include a phrase and/or search terms that include elements, attributes, conditions, or other aspects of a virtual world, such as a set of traits for agents to be simulated (e.g., associated with a target consumer group), a set of environmental conditions associated with the world (e.g., a geographical area to be simulated and/or a season or climate), and/or other suitable information. By doing so, the disclosed operations enable generation of user-specified, flexible, and configurable attributes associated with simulation of interactions between agents.

At 1320, the multi-agent simulator platform can provide the user input to an input configuration model to generate agent traits and/or data-source identifiers. For example, the multi-agent simulator platform inputs the user input into a configuration generation model to generate at least one of: (1) a set of agent traits of a set of agents in a virtual world or (2) a set of data-source identifiers of a set of external data sources. As an illustrative example, the platform provides user input relating to retail sentiment analysis for holiday shopping to a configuration generation model that generates agent traits (e.g., demographic information of potential shoppers, CEOs of holiday-related consumer goods companies, purchasing preferences of target shoppers, and/or seasonal shopping behaviors). Additionally or alternatively, the platform generates a list of potential external sources or data that are relevant to the user input (e.g., identifiers of holiday catalogues, seasonal marketing trends, economic trends or indicators, such as consumer price index values, and/or other suitable indications of external sources or associated data). By doing so, the multi-agent simulator platform enables automated generation of contextually relevant simulation parameters based on user input, improving the tunability and focus of complex, multi-agent simulations to a user-specified context.

At 1330, the multi-agent simulator platform can generate the virtual world including the set of agents. As an illustrative example, the multi-agent simulator platform instantiates a virtual world that simulates consumers engaged in holiday shopping. The agents can be associated with traits (e.g., default traits and/or traits associated with the user input). The multi-agent simulator platform can generate a template world (e.g., with default characteristics and/or pre-specified characteristics that can be modified subsequently). By doing so, the multi-agent simulator platform enables realistic modeling of complex social interactions based on simulating interactions between agents within a virtual world with relevant properties, constraints, or expected behaviors.

At 1340, the multi-agent simulator can instantiate the set of agents, including a first agent with the set of agent traits. For example, in response to generating the set of agent traits of the set of agents in the virtual world, the multi-agent simulator instantiates the set of agents including a first agent associated with the set of agent traits. Each agent of the set of agents can be associated with one or more machine learning models. Each agent of the set of agents can be associated with memory, one or more processors, and one or more agent interfaces configured to execute at least one action. As an illustrative example, the multi-agent simulator platform instantiates a set of agents within the virtual world, where the virtual world represents holiday shopping consumers within a particular geographical region (e.g., New York City), based on traits that are relevant to the user input (e.g., the user's query). For example, the agents are calibrated and/or determined using demographic training data to match statistical distributions of likely holiday shopping consumers within New York, with specific characteristics such as age, income level, educational level and/or other suitable characteristics. By doing so, the disclosed operations enable creation of a diverse and representative set of simulated entities tailored to specific simulation scenarios specified by the user based on the user input.

In some implementations, the multi-agent simulator platform uses agent traits to generate a second agent different from the first agent. For example, the multi-agent simulator platform generates, using the configuration generation model, the set of agent traits including at least two of: a processor identifier, an operating system identifier, a hardware component identifier, a network configuration identifier, a role indicator, an institution identifier, an age value, a salary value, a residence address identifier, a political affiliation identifier, and an educational attainment identifier. The multi-agent simulator platform can generate, for a first agent of the set of agents, the set of agent traits. The multi-agent simulator platform can modify a first agent trait of the set of agent traits to generate a second set of agent traits associated with a second agent of the set of agents. The multi-agent simulator platform can instantiate the first agent associated with the set of agent traits and the second agent associated with the second set of agent traits. As an illustrative example, the multi-agent simulator platform generates a first agent with traits that include a 25-year-old female marketing professional with a salary value of $75,000 a year, and a residence address identifier associated with Manhattan. The platform can generate a second agent within the simulation that is associated with a modified value (e.g., a modified age), and/or a modified set of values (e.g., according to external data, such as demographic/census data associated with the set of data-source identifiers). By doing so, the disclosed operations enable systematic variation of agent characteristics to test impression responses (e.g., to questions associated with the user) across diverse scenarios and/or demographic segments.

At 1350, the multi-agent simulator platform can retrieve external data from one or more external data sources. For example, in response to generating the set of data-source identifiers of the set of external data sources, the multi-agent simulator retrieves external data from one or more external data sources of the set of external data sources. As an illustrative example, the multi-agent simulator platform retrieves external data, such as Black Friday or other holiday-related sales figures, demographic information relating to likely shoppers, social media sentiment feeds associated with real-time consumer reactions (e.g., to holiday promotions or product launches), economic indicators (e.g., consumer confidence indices, unemployment rates, inflation data), weather data (e.g., affecting retail shop behavior and/or online-shopping behavior), and/or other suitable data.

By doing so, the disclosed operations enable dynamic incorporation of real-world market conditions and/or other suitable information into agent behavior modeling, providing contextually relevant, dynamically retrieved constraints reflecting actual economic and social factors. As such, the disclosed technology enables improvements to the accuracy and adaptability of social/economic simulations.

In some implementations, the multi-agent simulator platform retrieves external data based on a uniform resource locator. For example, the multi-agent simulator platform determines, based on the set of data-source identifiers, a first uniform resource locator associated with a first external data source of the one or more external data sources. The first external data source can be associated with cybersecurity vulnerability data, economic data, news data, or social media feed data. The multi-agent simulator platform can retrieve, using the first uniform resource locator and an application programming interface (API), a first dataset associated with the first external data source. As an illustrative example, the multi-agent simulator platform can determine a uniform resource locator (URL) associated with particular social media account feeds relating to holiday shopping in New York, and/or other suitable locators for other external data sources (e.g., URL to census data). By doing so, the disclosed operations enable the execution of data retrieval protocols that can be consistently applied across different external sources, facilitating the integration of diverse data types through API-based methods.

At 1360, the multi-agent simulator platform can provide the set of agent traits and the external data to a hypothesis generation model to generate a first hypothesis. For example, the multi-agent simulator platform inputs the set of agent traits and the external data into a hypothesis generation model to generate a first hypothesis comprising a first question based on the external data. The first hypothesis can include a first constraint associated with the external data. The first question can be associated with the set of agents associated with the set of agent traits. As an illustrative example, the multi-agent simulator provides agent traits for holiday shoppers (e.g., representing demographics associated with 25-25-year-old professionals with household incomes between $60,000 and $100,000 living in Manhattan and Brooklyn), as well as external data (e.g., including consumer confidence indices, social media sentiment metric values, and/or previous Black Friday sales values) to the hypothesis generation model to generate a hypothesis that includes a question (e.g., to be asked of agents). The question can include, for example, "How effective will a flash sale on electronics be during the final weekend before Christmas for urban millennials in New York, given the current inflation rate of 15%?" By doing so, the multi-agent simulator platform enables generation of contextually relevant questions based, in part, on user input, but completed or filled in with additional, relevant information based on external data and/or dynamically retrieved data. As such, the disclosed operations enable generation of contextually-relevant hypotheses that reflect current conditions (e.g., that are unknown to the user and/or otherwise not provided by the user), thereby facilitating the creation of realistic simulation scenarios based on actual, dynamically created data.

In some implementations, the multi-agent simulator platform generates the first hypothesis based on an indication of the first constraint. For example, the multi-agent simulator platform can provide the first dataset associated with the first external data source to a constraint generation model to generate the first constraint. The first constraint includes at least one of: an indication of an economic indicator, an environmental indicator, a regulatory requirement, or an agent-interaction constraint. The multi-agent simulator platform can generate a first data schema, associated with the first hypothesis. The first data schema can include an indication of the first constraint. As an illustrative example, the multi-agent simulator platform provides external data, including the consumer confidence indices and/or weather information relating to temperatures in New York, and/or information relating to the regulation of holiday goods (e.g., including associated tariffs), to the constraint generation model to generate an indication of a constraint (e.g., for inclusion within a data schema associated with a hypothesis). For example, the constraint can include a first value (e.g., of tariff rates) associated with a first tag (labelled "tariffs"). By doing so, the disclosed operations enable generation of information relating to data-driven limitations, thereby improving the accuracy of agent behavior and virtual world modeling.

In some implementations, the multi-agent simulator platform generates the first hypothesis based on a user selection of a question. For example, the multi-agent simulator platform provides the set of agent traits and the external data to the hypothesis generation model to generate a set of questions based on the external data. The multi-agent simulator platform can generate, for display on the GUI, representations of the set of questions. In response to generating, for display on the GUI, the representations of the set of questions, the multi-agent simulator platform can receive, via the GUI, a user selection of the first question of the set of questions. The multi-agent simulator platform can generate the first hypothesis comprising the first question associated with the user selection. As an illustrative example, the multi-agent simulator platform generates a set of questions, including "How do consumers react to buy-one-get-one promotions during Black Friday weekend?" and "What is the impact of limited-time offers on purchasing decisions for holiday gifts?" The platform can cause these questions to be displayed on the GUI of the user device and enables a user of the GUI to select an option (e.g., previewing information showing associated external data sources and/or potential constraints associated with the question). To illustrate, when the user selects the first question, the GUI can cause display of an indicator that the simulation is applicable to Black Friday weekend (and not to other times). The platform can generate a hypothesis based on the selected question, thereby enabling user-driven hypothesis selection that aligns simulation sessions to particular research interests and/or business objectives as specified by the user.

In some implementations, the multi-agent simulator platform generates the first hypothesis based on a user modification of a question. For example, the multi-agent simulator platform generates, for display on the GUI, a representation of a preliminary question. In response to generating, for display on the GUI, the representation of the preliminary question, the multi-agent simulator platform receives, via the GUI, the first question. The first question can be a modified version of the preliminary question. The multi-agent simulator platform can generate the first hypothesis including the first question. As an illustrative example, the multi-agent simulator platform generates a preliminary question, such as "What is the effectiveness of holiday discounts?", and displays the question via the GUI for user review and modification (e.g., within a modifiable textbox or other suitable user control). The user can modify the question via the GUI to specify, for example, "What is the effectiveness of buy-one-get-one-free promotions on electronics during Black Friday morning hours for families with children in Brooklyn?" The platform can receive the user-modified question (e.g., specifying additional constraints and/or fewer constraints as compared to the preliminary question) and generate the hypothesis accordingly. By doing so, the disclosed operations enable user-driven refinement of simulation scenarios for hypothesis generation. For example, the multi-agent simulator platform enables iterative hypothesis development combining automated question generation with user refinements, improving the flexibility and applicability of the resulting simulation session according to user-driven constraints or hypotheses.

In some implementations, the multi-agent simulator platform generates the first hypothesis including a value associated with the first constraint. For example, the multi-agent simulator platform determines, based on the external data, a first value associated with the first constraint. The multi-agent simulator platform can generate the first question including an indication of the first value associated with the first constraint. The multi-agent simulator platform can generate the first hypothesis including the first question. As an illustrative example, the multi-agent simulator platform can determine a first value (e.g., an annual inflation rate of 10%) based on external data showing that the value can fall within a particular range (e.g., between a minimum and a maximum value, such as an annual inflation rate that can vary between 5% and 15%). Based on this value, the multi-agent simulator platform can generate a question and/or an associated hypothesis (e.g., via a data schema) that includes the constraint (e.g., "What is the likely consumer response to a buy-one-get-one-free sale during Black Friday weekend when the inflation rate is 10%?"). In some implementations, the multi-agent simulator platform generates an indication of the constraint (e.g., a key-value pair) within a data schema associated with the generated hypothesis. By doing so, the multi-agent simulator platform enables generation of constraints on simulation sessions based on external data, thereby improving the applicability, tunability, and accuracy of the associated simulation session.

At 1370, the multi-agent simulator platform can execute a simulation session consistent with the first constraint. For example, the multi-agent simulator platform executes a simulation session, consistent with the first constraint, by causing the set of agents to generate, using the first hypothesis and the first question, a first output set. As an illustrative example, the multi-agent simulator platform executes a simulation session where agents representing families with children (e.g., with suitable traits) interact with the first hypothesis (e.g., a scenario associated with a specified inflation rate and a particular marketing strategy, such as a buy-one-get-one-free sale) within the virtual world (e.g., according to specified interaction rules between agents). The platform can generate questions to ask individual agents based on the first hypothesis and/or generate resulting responses (e.g., outputs within the first output set). For example, each agent of the set of agents generates a particular output of the first output set. The output can include a purchase likelihood score, a social media sharing intention, foot traffic simulation data, and/or a sentiment/impression (e.g., a textual summary thereof). In some implementations, the outputs of the output set are consistent with constraints associated with the first hypothesis (e.g., are associated with agents with interaction rules, inputs, and/or prompts specified by one or more constraints).

In some implementations, the multi-agent simulator platform provides a first data schema (e.g., associated with the first hypothesis) and the first question to a first agent to generate a first output. As an illustrative example, the multi-agent simulator platform generates a first data schema including a representation of the first constraint. The multi-agent simulator platform can provide the first data schema and the first question to the first agent of the set of agents. In response to providing the first data schema and the first question to the first agent, the multi-agent simulator platform can generate a first output for the first output set. As an illustrative example, the multi-agent simulator platform generates the data schema including an indication of a key-value pair associated with a particular constraint, such as "Annual_Inflation_Rate=0.15" (e.g., in a suitable format, such as a YAML or XML format). The data schema can, additionally or alternatively, represent input items, agent traits, world characteristics, and/or other suitable information relating to the simulation. By doing so, the disclosed operations enable generation of individualized agent responses that are consistent with specified constraints (e.g., derived from external data) in a universal format (e.g., in a manner that captures multiple formats of input data, constraints, and/or scenarios, such as marketing strategies).

At 1380, the multi-agent simulator platform can generate a representation of the first output set. For example, the multi-agent simulator platform generates, for display on the GUI, a representation of the first output set. As an illustrative example, the multi-agent simulator platform generates a representation displaying a sentiment analysis (e.g., including adjectives and/or other sentiment tokens) associated with the agents of the simulation session. The sentiment analysis can include demographic breakdowns and/or associated agent feedback information (e.g., as discussed in relation to FIG. 11). By doing so, the multi-agent simulator platform enables visualization of complex multi-agent simulation results in an accessible format.

Conclusion

From the foregoing, it will be appreciated that specific embodiments of the invention have been described herein for purposes of illustration, but that various modifications may be made without deviating from the scope of the invention. Accordingly, the invention is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A computer-implemented method for a multi-agent simulator, the method comprising operations for incremental machine-learning agentic cybersecurity simulations without regenerating input units by:

generating a virtual computing environment comprising a set of computing agents, wherein each computing agent in the set of computing agents simulates a computing system configuration, and

wherein the each computing agent in the set of computing agents is associated with:

(i) at least one memory, (ii) at least one processor, (iii) at least one machine-learning model comprising a set of neurons connected by synaptic circuits comprising at least a portion of the at least one memory, and (iv) one or more agent interfaces configured to execute at least one or more actions, a first agent in the set of computing agents having one or more agent traits relating to an aspect of system configuration;

receiving, via a graphical user interface (GUI) of a computing device, instructions comprising (1) a question, (2) a set of input traits indicative of at least one aspect of the computing system configuration, and (3) a first input item comprising a set of non-textual input units;

wherein the question comprises a first query;

using the set of non-textual input units, generating, according to a first input format, a first data schema and a first hypothesis associated with the first data schema, wherein the first data schema comprises (1) a set of keys and (2) a set of values, and wherein each value of the set of values is associated with a corresponding key of the set of keys;

instantiating the set of computing agents using the set of input traits by dynamically allocating the at least one memory and the at least one processor; and using the dynamically allocated at least one memory and at least one processor, executing the agentic cybersecurity simulations without regenerating schema representations for the non-textual input units, by:

executing a first simulation session by causing machine-learning models of the set of computing agents to generate, using the first hypothesis and the first query, a first output set;

modifying a first value associated with a first key of the first data schema to generate a second hypothesis associated with a second data schema;

executing a second simulation session by causing the machine-learning models of the set of computing agents to generate, using the second hypothesis and the first query, a second output set;

generating (1) a first impression token associated with the first output set and (2) a second impression token associated with the second output set; and displaying at least a portion of the first output set and the second output set at the GUI, wherein the at least a portion of the first output set and the second output set comprise a representation of the first and second impression tokens.

2. The method of claim 1, wherein generating the first impression token comprises:

performing impression analysis on the first output set, including:

tokenizing the first output set into a set of items;

applying an impression analysis model to generate the first impression token based on the set of items;

generating an impression summary based on the first impression token; and providing the impression summary to an experimenter via the GUI.

3. The method of claim 1, wherein generating the first hypothesis comprises:

retrieving, from a schema template database, a schema template associated with the first input format;

determining, using the schema template, the set of keys, wherein a particular key of the set of keys indicates a particular property of data structures of the first input format;

providing the set of keys and the first input item to a schema generation model to generate the set of values corresponding to the set of keys; and generating the first data schema including the set of values and the set of keys.

4. The method of claim 1, wherein generating the first hypothesis comprises:

determining, based on the first query, a second input format;

providing the first input item to a data conversion model to generate an updated first input item, wherein the updated first input item is of the second input format; and generating the first hypothesis comprising the first data schema, wherein the set of keys of the first data schema is associated with the second input format.

5. The method of claim 1, wherein generating the second output set comprises:

generating, based on the first output set and the second hypothesis, a second query; and executing the second simulation session by causing the set of computing agents to generate, using the second hypothesis and the second query, the second output set.

6. The method of claim 1, wherein generating the second hypothesis comprises:

determining the first key of the set of keys;

determining the first value, of the set of values, that is associated with the first key;

after generating the first impression token based on the first output set, modifying, based on the first impression token, the first value to generate a second value; and generating the second data schema, wherein the second data schema includes the second value associated with the first key.

7. The method of claim 1, wherein generating the second hypothesis comprises:

accessing an additional data source to generate one or more virtual computing environment characteristics comprising one or more of: (1) an environmental condition or (2) a temporal condition; and modifying, using the environmental condition and/or the temporal condition, the first value associated with the first key of the first data schema to generate the second data schema.

8. The method of claim 1, wherein generating the second hypothesis comprises:

determining a second input format;

providing the first input item to a data conversion model to generate a second input item, wherein the second input item is of the second input format; and using the second input format and the second input item, generating the second hypothesis comprising the second data schema, wherein the second data schema comprises (1) a second set of keys and (2) a second set of values, and wherein each value of the second set of values is associated with a corresponding key of the second set of keys.

9. The method of claim 1, wherein modifying the first value associated with the first key of the first data schema to generate the second hypothesis comprises:

determining that the first input format corresponds to a visual format;

determining a first visual attribute comprising at least one of: a background color, a background texture, an illustration style, a contrast level, a saturation level, foreground color, a border style, a shadow effect, a transparency level, an animation effect, a gradient, a pattern, a lighting effect, or a resolution parameter;

determining the first key associated with the first visual attribute;

determining the first value associated with the first visual attribute;

generating a second value associated with the first key, wherein the second value is different from the first value; and generating the second hypothesis comprising the second value associated with the first key.

10. The method of claim 1, wherein modifying the first value associated with the first key of the first data schema to generate the second hypothesis comprises:

determining that the first input format corresponds to an audio format;

determining a first audio attribute comprising at least one of: a sample rate, a bit depth, a channel configuration, a compression ratio, a frequency range, a dynamic range, a loudness level, a tempo setting, a playback speed, an average pitch value, or an equalization setting;

determining the first key associated with the first audio attribute;

determining the first value associated with the first audio attribute;

generating a second value associated with the first key, wherein the second value is different from the first value; and generating the second hypothesis comprising the second value associated with the first key.

11. The method of claim 1, further comprising generating the representation of the first and second impression tokens, including:

tokenizing the first output set into a first set of items;

tokenizing the second output set into a second set of items;

providing the first set of items and the second set of items to an impression analysis model to generate an impression summary associated with the first output set and the second output set; and generating the representation of the first and second impression tokens, wherein the representation comprises the impression summary.

12. The method of claim 1, further comprising:

using the first query, the first input item, and additional data from an additional data source to generate a set of hypotheses to include in a question chain comprising the question, wherein each hypothesis of the set of hypotheses is associated with a corresponding input item of a set of input items; and executing a particular simulation session for each hypothesis in the set of hypotheses.

13. One or more non-transitory, computer-readable media having computer-executable instructions thereon for a multi-agent simulator, the instructions, when executed by at least one processor, causing a computing system to perform operations for incremental machine-learning agentic cybersecurity simulations without regenerating input units by:

generating a virtual computing environment comprising a set of agents, wherein each computing agent in the set of computing agents simulates a computing system configuration, and wherein the each computing agent in the set of computing agents is associated with:

(i) at least one memory, (ii) the at least one processor, (iii) at least one machine-learning model comprising a set of neurons connected by synaptic circuits comprising at least a portion of the at least one memory, and (iv) one or more agent interfaces configured to execute at least one or more actions, a first agent in the set of computing agents having one or more agent traits relating to an aspect of system configuration;

receiving (1) a question, (2) a set of input traits indicative of at least one aspect of the computing system configuration, and (3) a first input item comprising a set of non-textual input units;

wherein the question comprises a first query;

using the set of non-textual input units, generating, according to a first input format a first data schema and a first hypothesis associated with the first data schema;

instantiating the set of agents using the set of input traits by dynamically allocating the at least one memory and the at least one processor; and using the dynamically allocated at least one memory and at least one processor, executing the agentic cybersecurity simulations without regenerating schema representations for the non-textual input units, by:

executing a first simulation session by causing machine-learning models of the set of agents to generate, using the first hypothesis and the first query, a first output set;

generating a second hypothesis associated with a second data schema;

executing a second simulation session by causing the machine-learning models of the set of agents to generate, using the second hypothesis and the first query, a second output set;

providing a representation the first and second output sets to an impression analysis model to generate an impression summary associated with the first hypothesis and the second hypothesis; and displaying a representation of the impression summary at a GUI.

14. The one or more non-transitory, computer-readable media of claim 13, wherein the instructions for generating the first hypothesis cause the computer system to perform operations comprising:

retrieving, from a schema template database, a schema template associated with the first input format;

determining, using the schema template, a set of keys, wherein each key of the set of keys indicates a particular property of data structures of the first input format;

providing the set of keys and the first input item to a schema generation model to generate a set of values corresponding to the set of keys; and generating the first data schema including the set of values and the set of keys.

15. The one or more non-transitory, computer-readable media of claim 13, wherein the instructions for generating the first hypothesis cause the computer system to perform operations comprising:

determining, based on the first query, a second input format;

determining that the second input format does not correspond to the first input format;

in response to determining that the second input format does not correspond to the first input format, providing the first input item to a data conversion model to generate an updated first input item, wherein the updated first input item is of the second input format; and generating the first hypothesis comprising the first data schema based on the updated first input item.

16. The one or more non-transitory, computer-readable media of claim 13, wherein the instructions for generating the second output set cause the computer system to perform operations comprising:

generating, based on the first output set and the second hypothesis, a second query; and executing the second simulation session by causing the set of agents to generate, using the second hypothesis and the second query, the second output set.

17. The one or more non-transitory, computer-readable media of claim 13, wherein the instructions for generating the second hypothesis cause the computer system to perform operations comprising:

tokenize the first output set into a first set of items;

provide the first set of items to the impression analysis model to generate a first impression token associated with the first output set;

in response to generating the first impression token associated with the first output set, determining a first key of a set of keys associated with the first data schema;

determining a first value, of a set of values corresponding to the set of keys, that is associated with the first key;

modifying, based on the first impression token, the first value to generate a second value; and generating the second data schema, wherein the second data schema includes the second value associated with the first key.

18. The one or more non-transitory, computer-readable media of claim 13, wherein the instructions for generating the second hypothesis cause the computer system to perform operations comprising:

accessing an additional data source to generate one or more virtual computing environment characteristics comprising (1) an environmental condition and (2) a temporal condition; and modifying, using the environmental condition and/or the temporal condition, a first value associated with a first key of the first data schema to generate the second data schema.

19. A computer system having at least one processor and at least one memory unit having computer-executable instructions stored therein for a multi-agent simulator, the instructions, when executed by the at least one processor, causing the computer system to perform operations for incremental machine-learning agentic cybersecurity simulations without regenerating input units, comprising:

generate a virtual computing environment comprising a set of agents, wherein each computing agent in the set of computing agents simulates a computing system configuration, and wherein the each computing agent in the set of computing agents is associated with:

(i) at least one memory, (ii) the at least one processor, (iii) at least one machine-learning model comprising a set of neurons connected by synaptic circuits comprising at least a portion of the at least one memory, and (iv) one or more agent interfaces configured to execute at least one or more actions, a first agent in the set of agents having: (1) one or more agent traits relating to an aspect of system configuration, and (2) one or more local interaction rules implemented by the at least one machine-learning a first trained machine learning model;

receive (1) a question, (2) a set of input traits indicative of at least one aspect of the computing system configuration, and (3) a first input item comprising a set of non-textual input units;

wherein the question comprises a query;

using the set of non-textual input units, generate, according to a first input format a first data schema and a first hypothesis associated with the first data schema;

instantiate the set of agents using the set of input traits by dynamically allocating the at least one memory and the at least one processor; and using the dynamically allocated at least one memory and at least one processor, executing the agentic cybersecurity simulations without regenerating schema representations for the non-textual input units, comprising:

execute a first simulation session by causing machine-learning models of the set of agents to generate, using the first hypothesis and the query, a first output set;

generate a second hypothesis associated with a second data schema;

execute a second simulation session by causing the machine-learning models of the set of agents to generate, using the second hypothesis and the query, a second output set;

provide a tokenized representation of the first output set and a tokenized representation of the second output set to an impression analysis model to generate an impression summary associated with the first hypothesis and the second hypothesis; and display a representation of the impression summary at a GUI.

20. The computer system of claim 19, wherein the instructions further cause the computer system to:

use the query, the first input item, and additional data from an additional data source to generate a set of hypotheses to include in a question chain comprising the question, wherein each hypothesis of the set of hypotheses is associated with a corresponding input item of a set of input items; and execute a particular simulation session for each hypothesis in the set of hypotheses.

\* \* \* \* \*